US012306648B2

(12) United States Patent
Sisco

(10) Patent No.: US 12,306,648 B2
(45) Date of Patent: May 20, 2025

(54) FILTERED WATER SUPPLY EXTENSION SYSTEM FOR AN EXTERNAL APPLIANCE

(71) Applicant: Frank Peter Sisco, Sewell, NJ (US)

(72) Inventor: Frank Peter Sisco, Sewell, NJ (US)

( * ) Notice: Subject to any disclaimer, the term of this patent is extended or adjusted under 35 U.S.C. 154(b) by 492 days.

(21) Appl. No.: 17/722,303

(22) Filed: Apr. 16, 2022

(65) Prior Publication Data

US 2022/0334600 A1    Oct. 20, 2022

Related U.S. Application Data

(60) Provisional application No. 63/176,259, filed on Apr. 17, 2021.

(51) Int. Cl.
*G05D 7/06* (2006.01)
*B01D 35/02* (2006.01)
(Continued)

(52) U.S. Cl.
CPC .......... *G05D 7/0652* (2013.01); *B01D 35/02* (2013.01); *B01D 35/1573* (2013.01); *F25D 23/126* (2013.01); *F25D 2323/121* (2013.01)

(58) Field of Classification Search
CPC .. G05D 7/0652; B01D 35/02; B01D 35/1573; F25D 23/126; F25D 2323/121
(Continued)

(56) References Cited

U.S. PATENT DOCUMENTS 3,969,909 A * 7/1976 Barto ................... F25C 1/25
62/340
5,135,645 A * 8/1992 Sklenak ............... B01D 35/153
210/441
(Continued)

FOREIGN PATENT DOCUMENTS

CN      2536852 Y  *  2/2003
CN      1627017 A  *  6/2005
(Continued)

OTHER PUBLICATIONS

KR 20080027646A machine translation (Year: 2024).*
(Continued)

*Primary Examiner* — Eric S Ruppert
*Assistant Examiner* — Kirstin U Oswald
(74) *Attorney, Agent, or Firm* — Ashok Tankha

(57) ABSTRACT

A filtered water supply extension system including an extension member and a flow control device, and a method for extending a filtered water supply of a primary appliance, for example, a refrigerator, to an external appliance, for example, a coffee maker, are provided. The extension member draws and directs an additional flow of filtered water from a water filter of the primary appliance to the external appliance, without interrupting a regular flow of filtered water from the water filter to one or more internal appliances, for example, an ice maker, a water dispenser, etc., of the primary appliance. The flow control device connects the extension member to the external appliance and controls the additional flow of filtered water to the external appliance. A microcontroller, in communication with a control panel, controls a valve assembly for directing a measured quantity of filtered water from the water filter to the external appliance.

19 Claims, 13 Drawing Sheets

(51) Int. Cl.
*B01D 35/157* (2006.01)
*F25D 23/12* (2006.01)

(58) Field of Classification Search
USPC .......................................................... 62/390
See application file for complete search history.

(56) References Cited

U.S. PATENT DOCUMENTS

| | | | | |
|---|---|---|---|---|
| 5,490,547 | A * | 2/1996 | Abadi | B67D 3/0009 |
| | | | | 141/82 |
| 5,956,967 | A * | 9/1999 | Kim | F25D 23/126 |
| | | | | 62/390 |
| 6,375,834 | B1 * | 4/2002 | Guess | F25D 23/126 |
| | | | | 210/138 |
| 6,460,367 | B1 * | 10/2002 | DuHack | F25D 23/126 |
| | | | | 62/340 |
| 6,681,585 | B1 * | 1/2004 | Stagg | F25D 23/126 |
| | | | | 62/177 |
| 6,810,682 | B1 * | 11/2004 | Schuchart | F25D 23/126 |
| | | | | 62/98 |
| 7,210,601 | B2 * | 5/2007 | Hortin | B67D 1/0009 |
| | | | | 222/144.5 |
| 8,171,843 | B1 | 5/2012 | Heffington | A47J 31/545 |
| | | | | 99/305 |
| 2001/0023843 | A1 * | 9/2001 | Senner | C02F 9/20 |
| | | | | 210/232 |
| 2001/0052896 | A1 * | 12/2001 | Yun | G06Q 10/06 |
| | | | | 345/173 |
| 2003/0097314 | A1 * | 5/2003 | Crisp, III | B67D 1/0858 |
| | | | | 705/28 |
| 2003/0140966 | A1 * | 7/2003 | Kempf | E03B 7/045 |
| | | | | 137/337 |
| 2004/0182104 | A1 * | 9/2004 | Choi | F25D 23/028 |
| | | | | 62/389 |
| 2005/0268624 | A1 * | 12/2005 | Voglewede | F25D 23/126 |
| | | | | 62/126 |
| 2006/0150658 | A1 * | 7/2006 | Schuchart | F25D 23/126 |
| | | | | 62/340 |
| 2006/0196212 | A1 * | 9/2006 | Jenkins | F25C 1/25 |
| | | | | 62/340 |
| 2007/0074529 | A1 * | 4/2007 | Lim | F25D 23/126 |
| | | | | 62/440 |
| 2007/0089450 | A1 * | 4/2007 | Janardhanam | F25D 23/126 |
| | | | | 62/340 |
| 2007/0251261 | A1 * | 11/2007 | Son | F25D 27/00 |
| | | | | 62/390 |
| 2008/0142431 | A1 * | 6/2008 | Lim | F25D 23/126 |
| | | | | 62/465 |
| 2009/0282857 | A1 * | 11/2009 | An | F25D 23/126 |
| | | | | 62/449 |
| 2010/0275637 | A1 * | 11/2010 | Park | F25D 3/02 |
| | | | | 137/571 |
| 2010/0287971 | A1 * | 11/2010 | Lee | F25D 23/126 |
| | | | | 62/347 |
| 2010/0319388 | A1 * | 12/2010 | Yang | F25D 23/126 |
| | | | | 62/449 |
| 2011/0302935 | A1 * | 12/2011 | Cur | F25D 23/126 |
| | | | | 62/390 |
| 2012/0006046 | A1 * | 1/2012 | An | F25C 1/00 |
| | | | | 62/318 |
| 2012/0297814 | A1 * | 11/2012 | Kim | F25D 23/126 |
| | | | | 62/340 |
| 2014/0041409 | A1 * | 2/2014 | An | F25D 23/126 |
| | | | | 62/340 |
| 2014/0270724 | A1 * | 9/2014 | Hall | B67D 1/0895 |
| | | | | 392/341 |
| 2016/0083241 | A1 * | 3/2016 | Koo | F25D 23/126 |
| | | | | 222/1 |
| 2018/0347884 | A1 * | 12/2018 | Kang | F16K 11/24 |

FOREIGN PATENT DOCUMENTS

| | | | |
|---|---|---|---|
| CN | 202023962 U | * 11/2011 | |
| EP | 1602622 A1 | * 12/2005 | ........... B67D 1/0009 |
| KR | 20070105809 A | * 10/2007 | |
| KR | 20080027646 A | * 3/2008 | |
| KR | 20110125078 A | * 11/2011 | |

OTHER PUBLICATIONS

CN 202023962 U machine translation (Year: 2024).*
CN 2536852 Y machine translation (Year: 2024).*
KR 20110125078 A machine translation (Year: 2024).*
KR 20070105809 A (Year: 2024).*
CN 1627017 A machine translation (Year: 2024).*

* cited by examiner

FILTERED WATER SUPPLY EXTENSION SYSTEM FOR AN EXTERNAL APPLIANCE

CROSS-REFERENCE TO RELATED APPLICATIONS

This application claims priority to and the benefit of the provisional patent application titled "Filtered Water Supply Provision on a Refrigerator", U.S. application Ser. No. 63/176,259, filed in the United States Patent and Trademark Office on Apr. 17, 2021. The specification of the above referenced patent application is incorporated herein by reference in its entirety.

BACKGROUND

With recent advances in refrigerator technology, most refrigerators comprise water dispensers and ice dispensers. Furthermore, these refrigerators comprise water filters that supply filtered water to the water dispensers and ice makers built-into the refrigerators. In addition to the requirement for filtered water in a refrigerator, filtered water is also required in other parts of a kitchen or an office pantry, for example, to brew tea, make coffee, fill water bottles, etc. Kitchen appliances, for example, tea kettles for brewing tea, coffee makers for making coffee, etc., need filtered water for the brewing process. A separate water filter is typically used in most households to collect filtered water to be used in these kitchen appliances. The separate water filter is typically employed because filtered water from a refrigerator is accessible only through a water dispenser built-into the refrigerator. A user has to manually fill the filtered water from the water dispenser built-into the refrigerator into a container and then transfer the filtered water from the container into the kitchen appliances, which requires substantial effort. Moreover, substantial effort and time are required, for example, to remove a water reservoir of a kitchen appliance such as a coffee maker when the level of water in the water reservoir is low, and then to wait for water to fill into the water reservoir from another water source or a separate water filter, and then to reinstall the water reservoir in the coffee maker at its original position. Furthermore, there is an additional cost in purchasing a separate water filter for supplying filtered water to different kitchen appliances, when the refrigerator already contains a water filter. Furthermore, the additional water filter needs to be maintained at regular intervals, which requires recurrent purchases of replacement filters involving additional maintenance costs. There is a need for obviating the requirement of an additional water filter to save cost, time, and effort when filtered water is already available in a refrigerator.

Moreover, some refrigerators comprising water dispensers provide measured fill options that allow measured quantities of water to be dispensed through their water dispensers. Similarly, other kitchen appliances also require an automated functionality of filling measured quantities of water therein. Since refrigerators with measured fill options allow quick dispensing of predetermined quantities of water, there is a need for leveraging the added functionality of drawing predetermined quantities of filtered water from the refrigerator comprising a water dispenser with a measured fill option and extending the measured fill option of the refrigerator directly to other appliances to reduce manual effort and time.

Hence, there is a long-felt but unresolved need for a filtered water supply extension system incorporated into a primary appliance, for example, a refrigerator, that already contains a water filter, for tapping into the filtered water from the water filter of the primary appliance for use in one or more external appliances, for example, a beverage maker, a kettle, a water bottle, etc., without interrupting a regular flow of filtered water from the water filter to one or more internal appliances, for example, an ice maker, a water dispenser, etc., of the primary appliance and without having to resort to manually filling a container from the water dispenser of the primary appliance. Furthermore, in addition to providing a measured fill option for dispensing a measured quantity of filtered water through a water dispenser, there is a need for providing an additional measured fill option on the primary appliance for separately dispensing a measured quantity of filtered water as selected by a user to one or more external appliances from the primary appliance.

SUMMARY

This summary is provided to introduce a selection of concepts in a simplified form that are further disclosed in the detailed description. This summary is not intended to determine the scope of the claimed subject matter.

The system disclosed herein addresses the above-recited need for a filtered water supply extension system incorporated into a primary appliance, for example, a refrigerator, that already contains a water filter, for tapping into filtered water from the water filter of the primary appliance for use in one or more external appliances, for example, a beverage maker, a kettle, a water bottle, an external fluid dispenser, a liquid container, etc., without interrupting a regular flow of filtered water from the water filter to one or more internal appliances, for example, an ice maker, a water dispenser, etc., of the primary appliance and without having to resort to manually filling a container from the water dispenser of the primary appliance. Furthermore, in addition to providing a measured fill option for dispensing a measured quantity of filtered water through a water dispenser, the filtered water supply extension system disclosed herein provides an additional measured fill option on the primary appliance for separately dispensing a measured quantity of filtered water as selected by a user to one or more external appliances from the primary appliance.

The filtered water supply extension system disclosed herein is a filtered water supply connection installed, for example, on a rear wall of the primary appliance that already contains a water filter. The filtered water supply extension system supplies filtered water from the pre-existing water filter to an external appliance. The filtered water supply extension system comprises an extension member and a flow control device. The extension member is operably coupled to a water filter of a primary appliance, for example, a refrigerator. The extension member is configured to draw and direct an additional flow of filtered water from the water filter to at least one external appliance, in one of multiple modes, without interrupting a regular flow of filtered water from the water filter to one or more internal appliances of the primary appliance. The internal appliances comprise, for example, an ice maker, a water storage container, a water dispenser, etc., positioned at predetermined locations within the primary appliance.

In an embodiment of a first mode of operation of the filtered water supply extension system, the filtered water supply from the water filter is extended to at least one external appliance via a valve assembly operably coupled to the water filter and via the flow control device of the filtered water supply extension system. The valve assembly is operably coupled to the water filter and one or more of the internal appliances of the primary appliance. The valve assembly is configured to draw and direct a flow of the filtered water from the water filter to one or more of the internal appliances via respective supply lines. In an embodiment, the valve assembly comprises multiple solenoid valves. In the first mode, one of the solenoid valves is the extension member configured to draw and direct the additional flow of the filtered water to at least one external appliance through an extension pipe and the flow control device. Another one or more of the solenoid valves are operably coupled to one or more of the internal appliances via respective supply lines and are configured to draw and direct the flow of the filtered water to the internal appliances via the respective supply lines.

In an embodiment of a second mode of operation of the filtered water supply extension system, the extension member is a T-fitting member, also referred to as a T-connector, configured to draw and direct the additional flow of the filtered water from the water filter to at least one external appliance. In an embodiment, the T-fitting member is disposed on an outlet pipe of the water filter of the primary appliance, before the valve assembly comprising the solenoid valves that supply the cooled, filtered water to the internal appliances, for example, an ice maker for making ice cubes or crushed ice and a water dispenser for dispensing cooled drinking water. At the location of the T-fitting member, the piping of the primary appliance is routed along the rear wall of the refrigerator to connect to a control valve of the flow control device. The control valve allows a supplementary pipe, for example, a field supplied plastic waterline, to be pushed into the control valve and routed to the external appliance to dial in the quantity of filtered water needed.

The T-fitting member comprises a first connection element, a second connection element, and a third connection element. The first connection element is operably coupled to the water filter via a first pipe. The first connection element is configured to draw filtered water from the water filter. In an embodiment, the second connection element is operably coupled to the valve assembly of the primary appliance via a second pipe. In this embodiment, the second connection element is configured to direct a flow of the filtered water from the water filter to the valve assembly via the second pipe. In another embodiment, the second connection element is operably coupled to a water storage container of the primary appliance via the second pipe. In this embodiment, the second connection element is configured to direct a flow of the filtered water from the water filter to the water storage container via the second pipe. The water storage container is configured to store the filtered water. The third connection element is positioned substantially perpendicular to the first connection element and the second connection element. The third connection element is operably coupled to the flow control device via an extension pipe. The third connection element is configured to direct the additional flow of the filtered water to the flow control device through the extension pipe, and thereafter from the flow control device to at least one external appliance through a supplementary pipe.

In an embodiment, the water storage container is operably coupled to the valve assembly. In this embodiment, the water storage container is configured to draw, store, and direct a flow of the filtered water drawn from the valve assembly to one or more of the internal appliances via respective supply lines. In another embodiment, the water storage container is operably coupled to the water filter. In this embodiment, the water storage container is configured to draw, store, and direct a flow of the filtered water drawn from the water filter to one or more of the internal appliances via respective supply lines.

The flow control device comprises the control valve, for example, a shutoff valve, operably coupled to the extension member via the extension pipe extending from the extension member to the flow control device within the primary appliance. In an embodiment, the flow control device is positioned on a rear wall of the primary appliance. In another embodiment, the flow control device is positioned on a side wall of the primary appliance. The flow control device is externally connected to at least one external appliance via the supplementary pipe. The flow control device is configured to control the additional flow of the filtered water to at least one external appliance through the supplementary pipe. In an embodiment, the flow control device further comprises a push-on cap configured to plug the control valve when not in use for directing the additional flow of the filtered water to at least one external appliance through the supplementary pipe.

In an embodiment, the filtered water supply extension system further comprises a control panel and a microcontroller. The control panel is positioned on a front section of the primary appliance, for example, on a front door, a front wall, etc., of the primary appliance. The control panel comprises a user interface with separate measured fill options for selectively controlling the filtered water flowing through the valve assembly to at least one external appliance and one or more of the internal appliances. The microcontroller is operably connected to the control panel and in an embodiment, to the valve assembly. The microcontroller is configured to process user inputs received via the control panel and operate the valve assembly for drawing and directing a measured quantity of the filtered water to at least one external appliance and one or more of the internal appliances.

Disclosed herein is also a method for extending a filtered water supply of a primary appliance to one or more external appliances. In the method disclosed herein, the extension member is operably coupled to the water filter of the primary appliance. The flow control device comprising the control valve is operably coupled to the extension member via the extension pipe extending from the extension member to the flow control device within the primary appliance. The flow control device is also externally connected to at least one external appliance via the supplementary pipe. The extension member draws and directs an additional flow of filtered water from the water filter to at least one external appliance, in one of multiple modes as disclosed above, without interrupting a regular flow of filtered water from the water filter to one or more internal appliances of the primary appliance. The flow control device controls the additional flow of the filtered water to at least one external appliance via the supplementary pipe.

Disclosed herein is also a primary appliance, for example, a refrigerator, comprising an enclosure with a rear wall, side walls, a top wall, a bottom wall, and one or more front doors, a water filter, a valve assembly, a water storage container, and the filtered water supply extension system comprising the extension member and the flow control device as disclosed above. In one or more embodiments, related systems comprise circuitry and/or programming for executing the methods disclosed herein. The circuitry and/or programming comprise any combination of hardware, software, and/or firmware configured to execute the methods disclosed herein depending upon the design choices of a system designer. In an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the embodiments herein, exemplary constructions of the embodiments are shown in the drawings. However, the embodiments herein are not limited to the specific components, structures, and methods disclosed herein. The description of a component, or a structure, or a method step referenced by a numeral in a drawing is applicable to the description of that component, or structure, or method step shown by that same numeral in any subsequent drawing herein.

DETAILED DESCRIPTION

Figure 1:
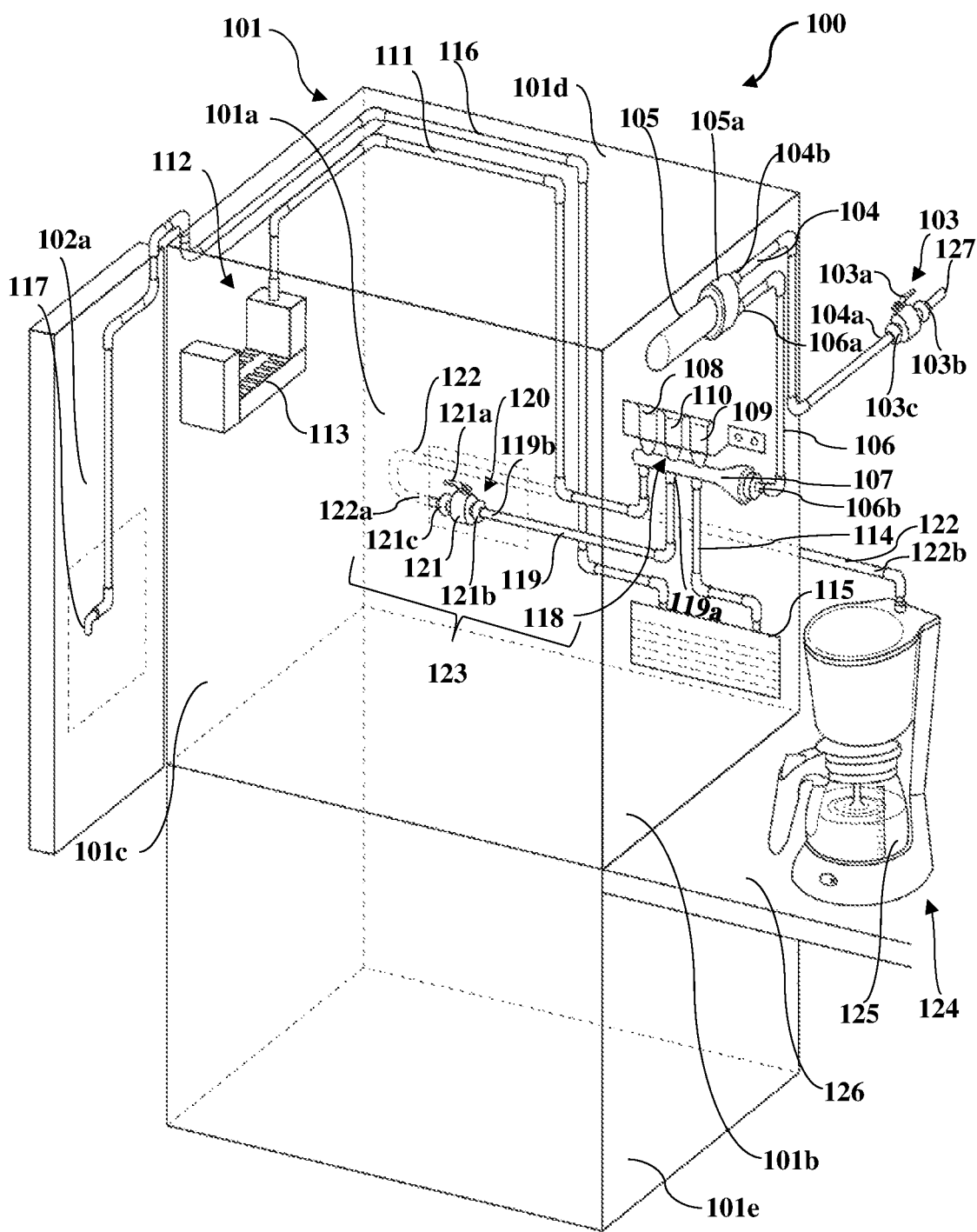
FIG. 1 exemplarily illustrates a front perspective view of a refrigerator comprising an embodiment of a filtered water supply extension system.

Disclosed herein is a filtered water supply extension system 123 incorporated into a primary appliance that already contains a water filter 105 exemplarily illustrated in FIG. 1, FIGS. 6-7, and FIGS. 10-11, for tapping into filtered water from the water filter 105 of the primary appliance for use in one or more external appliances, without interrupting a regular flow of filtered water from the water filter 105 to one or more internal appliances of the primary appliance. As used herein, "primary appliance" refers to an appliance containing a built-in water filter 105 for filtering water supplied by an external water supply system. For purposes of illustration, the disclosure herein refers to the primary appliance being a refrigerator 100 that already contains a water filter 105 as exemplarily illustrated in FIG. 1, FIGS. 6-7, and FIGS. 10-11; however, the scope of the system and the method disclosed herein is not limited to the primary appliance being a refrigerator 100, but extends to include any appliance that already contains a water filter 105 and that can be configured to tap into filtered water from the water filter 105 for use in one or more external appliances, without interrupting a regular flow of filtered water from the water filter 105 to one or more internal appliances of the appliance. Also, as used herein, "external appliance" refers to an appliance positioned external to the primary appliance and configured to receive filtered water from the built-in water filter 105 of the primary appliance. The external appliances comprise, for example, a beverage maker such as a coffee maker 124 exemplarily illustrated in FIG. 1 and FIG. 5, a tea maker, a juice maker, etc., a kettle, a water bottle, an external fluid dispenser, a liquid container, a pitcher, a carafe, etc., and any other kitchen appliance, household appliance, or other appliance that requires a source of filtered water. Also, as used herein, "internal appliance" refers to an appliance built-into the primary appliance for performing different functions. For example, the internal appliances comprise an ice maker 112 configured to make ice cubes, crushed ice, etc.; a water dispenser 117 configured to dispense filtered water from the primary appliance; a water storage container 115 configured to draw, store, and direct a flow of filtered water drawn from a valve assembly 107 or the water filter 105 to another one or more internal appliances via respective supply lines 114, 116, 106, 132, etc., as exemplarily illustrated in FIG. 1, FIGS. 6-7, and FIGS. 10-11. The internal appliances are positioned at predetermined locations within the primary appliance. The water storage container 115 is a holding tank or a reservoir, also referred to as a water tank, for storing the filtered water drawn from the water filter 105. In an embodiment, the existing piping of the primary appliance containing the water filter 105 is retrofitted with the filtered water supply extension system 123 at a point where the water is filtered and has constant supply pressure.

The filtered water supply extension system 123 disclosed herein comprises an extension member 118 and a flow control device 120 exemplarily illustrated in FIG. 1, FIGS. 6-7, and FIGS. 10-11. As used herein, the extension member 118 refers to a component, for example, a solenoid valve 110, a T-fitting member 131, etc., that extends a filtered water supply from the water filter 105 of a primary appliance such that an additional flow of filtered water from the water filter 105 is drawn and directed to at least one external appliance, without interrupting a regular flow of filtered water from the water filter 105 to one or more internal appliances of the primary appliance. The extension member 118 is operably coupled to the water filter 105 in various configurations as exemplarily illustrated in FIG. 1, FIGS. 6-7, and FIGS. 10-11. The filtered water supply extension system 123 operates in multiple modes, for example, a first mode and a second mode. For example, in a first mode of operation of the filtered water supply extension system 123, the filtered water supply from the water filter 105 is extended to at least one external appliance via a solenoid valve 110 of a valve assembly 107 operably coupled to the water filter 105 and via the flow control device 120 of the filtered water supply extension system 123 as exemplarily illustrated in FIG. 1, FIG. 6, and FIG. 11. In the first mode, the solenoid valve 110 is configured as the extension member 118 of the filtered water supply extension system 123. In another example, in a second mode of operation of the filtered water supply extension system 123, the filtered water supply from the water filter 105 is extended to at least one external appliance via an extension member 118 configured, for example, as a T-fitting member 131, and via the flow control device 120 of the filtered water supply extension system 123 as exemplarily illustrated in FIGS. 7-8 and FIG. 10.

The extension member 118 of the filtered water supply extension system 123 is positioned in different locations within the primary appliance in various configurations as disclosed below. In an example configuration, the extension member 118 is positioned within the valve assembly 107 that is operably coupled to the water filter 105 as exemplarily illustrated in FIG. 6. In another example configuration, the extension member 118 is connected between the water filter 105 and the valve assembly 107 as exemplarily illustrated in FIG. 7. In another example configuration, the extension member 118 is connected between the water filter 105 and the water storage container 115 that is operably coupled to the valve assembly 107 as exemplarily illustrated in FIG. 10. In another example configuration, the extension member 118 is positioned within the valve assembly 107 that is operably coupled to the water filter 105 via the water storage container 115 as exemplarily illustrated in FIG. 11. Although the descriptions of FIG. 1, FIGS. 6-7, and FIGS. 10-11 below disclose different configurations of the extension member 118 in various embodiments and modes of the filtered water supply extension system 123, the scope of the system and the method disclosed herein is not limited to the particular configurations exemplarily illustrated in FIG. 1, FIGS. 6-7, and FIGS. 10-11, but extends to include multiple other configurations and types of the extension member 118 that draws and directs an additional flow of filtered water from the water filter 105 to at least one external appliance, without interrupting a regular flow of filtered water from the water filter 105 to one or more internal appliances, for example, the ice maker 112, the water dispenser 117, etc., of the primary appliance.

FIG. 1 exemplarily illustrates a front perspective view of a refrigerator 100 comprising an embodiment of the filtered water supply extension system 123. In the embodiment exemplarily illustrated in FIG. 1, the primary appliance is a refrigerator 100 comprising an enclosure 101 with one or more front doors 102a, a rear wall 101a, side walls 101b and 101c, a top wall 101d, and a bottom wall 101e. The refrigerator 100 is shown in an open condition in FIG. 1. In the embodiment exemplarily illustrated in FIG. 1, the refrigerator 100 further comprises a water filter 105 and a water storage container 115 positioned at predetermined locations in the enclosure 101. The water filter 105 is configured to filter water drawn, for example, from a water supply system of a household or a building. As exemplarily illustrated in FIG. 1, the water filter 105 of the refrigerator 100 receives a supply of water from an external water supply system (not shown) via a control valve 103, for example, a shutoff valve. The control valve 103 comprises a handle 103a, an inlet end 103b, and an outlet end 103c. Operation of the handle 103a opens and closes the control valve 103, and accordingly allows and disallows flow of water respectively, to the water filter 105 of the refrigerator 100. The inlet end 103b of the control valve 103 is operably coupled to an external supply line 127 of the external water supply system.

In an embodiment, the water filter 105 is positioned inside the refrigerator 100 and proximal to the side wall 101b of the enclosure 101 as exemplarily illustrated in FIG. 1. The water filter 105 comprises an inlet pipe 104 and an outlet pipe 106 operably coupled to a filter housing 105a. The control valve 103, that is connected to the external supply line 127 of the external water supply system, is connected to the water filter 105 via the inlet pipe 104. That is, the outlet end 103c of the control valve 103 is operably coupled to a first end 104a of the inlet pipe 104 of the water filter 105 in the refrigerator 100 as exemplarily illustrated in FIG. 1. A second end 104b of the inlet pipe 104 is operably coupled to the filter housing 105a of the water filter 105. In an embodiment as exemplarily illustrated in FIG. 1, the water filter 105 is operably coupled to a valve assembly 107 internally positioned in the refrigerator 100. In an embodiment, the valve assembly 107 is attached to the rear wall 101a of the enclosure 101 as exemplarily illustrated in FIG. 1. In an embodiment, the valve assembly 107 is operably coupled to the water filter 105 via the outlet pipe 106. That is, a first end 106a of the outlet pipe 106 is operably coupled to the filter housing 105a of the water filter 105 and a second end 106b of the outlet pipe 106 is operably coupled to the valve assembly 107 as exemplarily illustrated in FIG. 1. The water filter 105 draws a supply of water from the control valve 103 through the inlet pipe 104 and filters the water. The water filter 105 then directs the filtered water to the valve assembly 107 through the outlet pipe 106.

The valve assembly 107 is further operably coupled to one or more internal appliances of the refrigerator 100. For example, the valve assembly 107 is operably coupled to an ice maker 112 comprising an ice tray 113 and to a water dispenser 117 via a water storage container 115 as exemplarily illustrated in FIG. 1. The valve assembly 107 is configured to draw a flow of the filtered water from the water filter 105 via the outlet pipe 106 and direct the filtered water to one or more internal appliances, for example, 112, 115, 117, etc., via respective supply lines 111, 114, 116, etc. In an embodiment, the valve assembly 107 comprises multiple solenoid valves 108, 109, and 110. One or more of the solenoid valves 108, 109, etc., are operably coupled to one or more internal appliances, for example, 112, 115, 117, etc., via the respective supply lines 111, 114, 116, etc., and are configured to draw and direct the flow of the filtered water to the internal appliances, for example, 112, 115, 117, etc., via the respective supply lines 111, 114, 116, etc. For purposes of illustration, the disclosure herein refers to the valve assembly 107 comprising three solenoid valves 108, 109, and 110 as exemplarily illustrated in FIG. 1; however, the scope of the system and the method disclosed herein extends to include any number of solenoid valves used for operating multiple different internal appliances of the refrigerator 100 and external appliances. The solenoid valves 108, 109, and 110 are electromechanical valves configured to control the flow of the filtered water. Each solenoid valve 108, 109, and 110 is operated by opening and closing a port internally disposed in the body of each solenoid valve 108, 109, and 110 for allowing and disallowing flow of the filtered water respectively, into multiple supply lines and pipes, for example, 111, 114, 116, and 119.

As exemplarily illustrated in FIG. 1, one solenoid valve 108 is operably coupled to the ice maker 112 via a first supply line 111, another solenoid valve 109 is operably coupled to the water storage container 115 via a second supply line 114, and another solenoid valve 110 is configured as an extension member 118 of the filtered water supply extension system 123 operating in the first mode for drawing and directing an additional flow of filtered water from the water filter 105 to at least one external appliance, for example, a coffee maker 124, without interrupting a regular flow of filtered water from the water filter 105 to the internal appliances, for example, the ice maker 112 and the water dispenser 117 via the water storage container 115 of the refrigerator 100. The connections of the supply lines 111, 114, and 116 from the valve assembly 107 to the internal appliances, for example, the ice maker 112, the water storage container 115, and the water dispenser 117, is disclosed in the description of FIG. 6. In an embodiment (not shown), a single solenoid valve is configured in the valve assembly 107 to supply the filtered water to both the ice maker 112 and the water storage container 115 using a two-way valve (not shown).

In the embodiment of the filtered water supply extension system 123 exemplarily illustrated in FIG. 1, the solenoid valve 110 configured as the extension member 118 is operably coupled to the flow control device 120 of the filtered water supply extension system 123 via an extension pipe 119. The extension pipe 119 is a supply line through which the filtered water is drawn from the solenoid valve 110 and directed to the flow control device 120 for supplying the filtered water to the external appliance, for example, 124. Application of a voltage through solenoid coil windings of each solenoid valve 108, 109, and 110 creates a magnetic field which opens or closes each solenoid valve 108, 109, and 110, thereby allowing or disallowing flow of the filtered water through the port of each solenoid valve 108, 109, and 110 and into the respective supply lines 111, 114, and 119.

Figure 2:
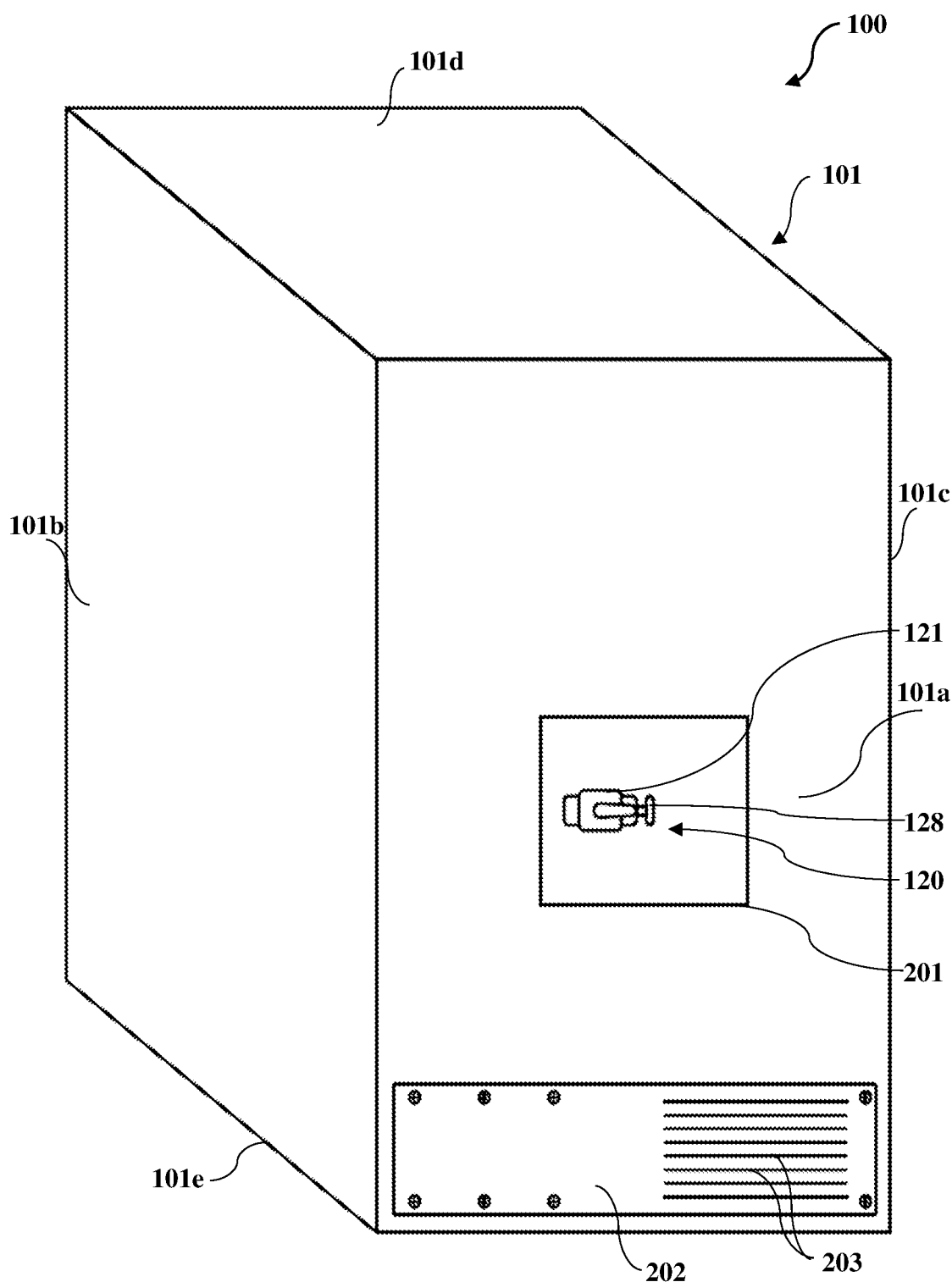
FIG. 2 exemplarily illustrates a rear perspective view of the refrigerator showing a flow control device of an embodiment of the filtered water supply extension system, positioned on a rear wall of the refrigerator.

In an embodiment as exemplarily illustrated in FIGS. 1-2, the flow control device 120 is positioned on the rear wall 101a of the enclosure 101 of the refrigerator 100. In another embodiment (not shown), the flow control device 120 is positioned on one of the side walls 101b and 101c of the enclosure 101 of the refrigerator 100. In other embodiments, the flow control device 120 is configured to be positioned in any accessible location of the enclosure 101 of the refrigerator 100 for allowing a user to conveniently access and connect a supplementary pipe 122 thereto for directing the additional flow of filtered water from the water filter 105 to the external appliance, for example, 124. In an embodiment as exemplarily illustrated in FIG. 1, the flow control device 120 comprises a control valve 121, for example, a shutoff valve, operably coupled to the extension member 118, herein referred to as the solenoid valve 110, via the extension pipe 119 extending from the solenoid valve 110 to the flow control device 120 within the enclosure 101. The flow control device 120 is externally connected to the external appliance, for example, 124, via a supplementary pipe 122. The supplementary pipe 122 is, for example, a field supplied plastic waterline, a ¼-inch tubing, a ⅝-inch tubing, etc. The flow control device 120 is configured to control the additional flow of the filtered water to the external appliance, for example, 124, through the supplementary pipe 122. The control valve 121 of the flow control device 120 comprises a handle 121a, an inlet end 121b, and an outlet end 121c. Operation of the handle 121a of the control valve 121 of the flow control device 120 opens and closes the control valve 121 and accordingly allows and disallows flow of the filtered water respectively, through the supplementary pipe 122 and into the external appliance, for example, 124. A first end 119a of the extension pipe 119 is operably coupled to the solenoid valve 110 of the valve assembly 107, and a second end 119b of the extension pipe 119 is operably coupled to the inlet end 121b of the control valve 121. Furthermore, a first end 122a of the supplementary pipe 122 is operably coupled to the outlet end 121c of the control valve 121, and a second end 122b of the supplementary pipe 122 is operably coupled to the external appliance, for example, 124, positioned on a countertop 126 external to the refrigerator 100 as exemplarily illustrated in FIG. 1. The control valve 121 of the flow control device 120 is, for example, ¼-inch push-on shutoff valve, a ⁵⁄₁₆-inch push-on shutoff valve, etc. The push-on connections of the push-on type of control valve 121 allows the second end 119b of the extension pipe 119 and the first end 122a of the supplementary pipe 122 to be push fitted into the inlet end 121b and the outlet end 121c of the control valve 121 of the flow control device 120 respectively. The push fitted supplementary pipe 122 feeds the filtered water into the external appliance. In an example, the external appliance is a coffee maker 124 comprising a carafe 125 for receiving the filtered water through the second end 122b of the supplementary pipe 122. In another embodiment (not shown), another connector, for example, a T-connector, a two-way valve, a three-way valve, etc., is operably coupled to the second end 122b of the supplementary pipe 122 for directing the additional flow of the filtered water into more than one external appliance simultaneously.

FIG. 2 exemplarily illustrates a rear perspective view of the refrigerator 100 showing the flow control device 120 of an embodiment of the filtered water supply extension system 123, positioned on a rear wall 101a of the refrigerator 100. The flow control device 120 shown in FIG. 2 is fitted in an enclosure 201 on the rear wall 101a of the refrigerator 100 and is ready for use with the refrigerator 100. In this embodiment, the flow control device 120 comprising the control valve 121, for example, the push-on shutoff valve, extends outwardly from the rear wall 101a of the refrigerator 100, thereby allowing the flow control device 120 to be operated, that is, opened or closed, at the rear wall 101a of the refrigerator 100. Positioning the flow control device 120 on the rear wall 101a of the refrigerator 100 precludes the need for removing the water filter 105 exemplarily illustrated in FIG. 1, or shutting off the water supply to the refrigerator 100 to stop water pressure.

Figure 5:
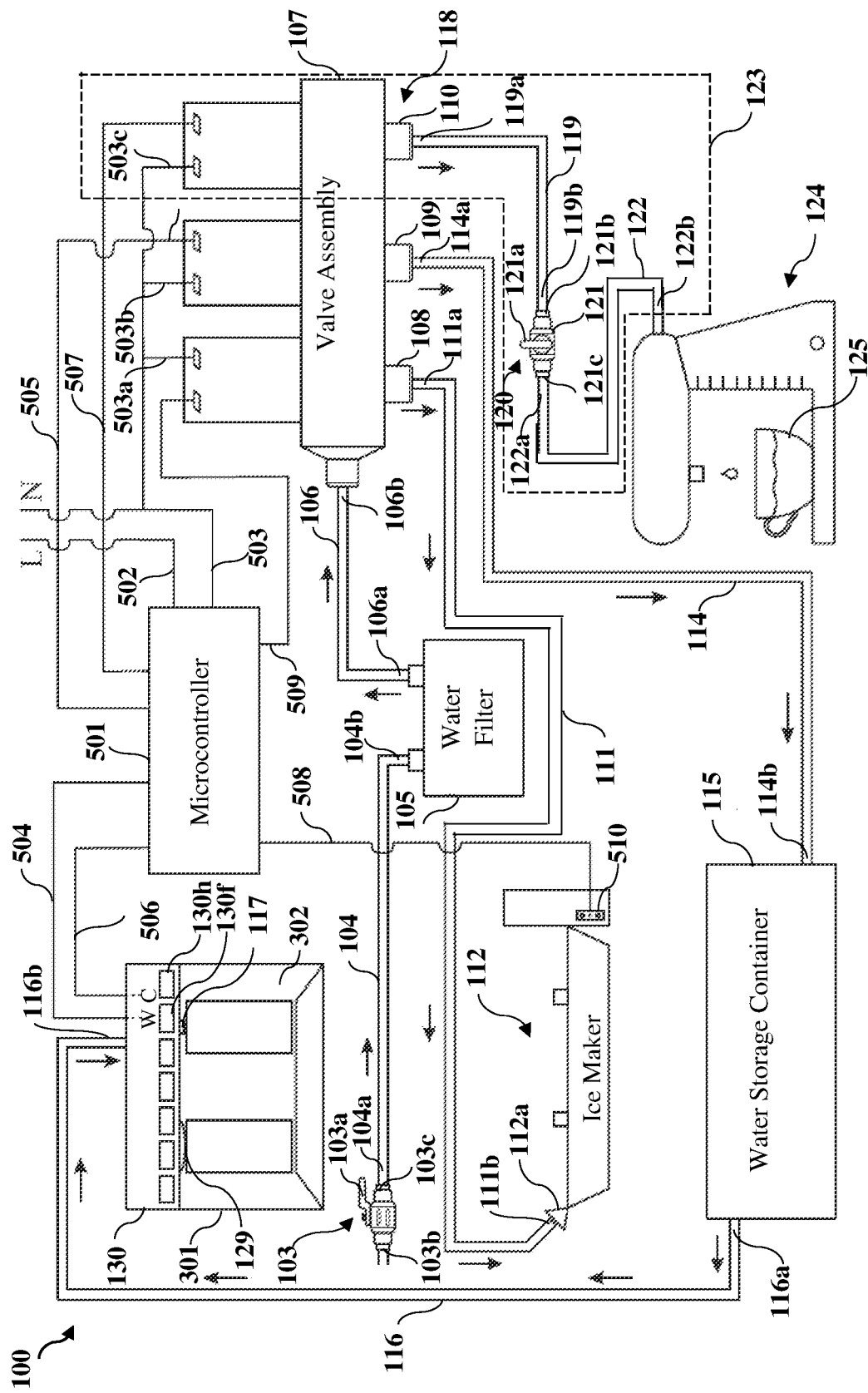
FIG. 5 exemplarily illustrates a schematic showing connections of a microcontroller to a valve assembly and the control panel of an embodiment of the filtered water supply extension system.

In an embodiment, the flow control device 120 further comprises a push-on cap 128 configured to plug the control valve 121 and prevent leakage when not in use for directing the additional flow of filtered water to at least one external appliance through the supplementary pipe 122, for example, a field supplied plastic waterline, exemplarily illustrated in FIG. 1. When the external appliance does not need to be filled with filtered water from the refrigerator 100, a user closes the control valve 121 using the handle 121a exemplarily illustrated in FIG. 1, disconnects the first end 122a of the supplementary pipe 122 from the outlet end 121c of the control valve 121 exemplarily illustrated in FIG. 1, and positions the push-on cap 128 on the outlet end 121c of the control valve 121 to plug the open outlet end 121c and in turn, the flow of filtered water from the refrigerator 100. When the external appliance needs to be filled with filtered water from the refrigerator 100, the user unplugs the push-on cap 128 from the outlet end 121c of the control valve 121, connects or push fits the first end 122a of the supplementary pipe 122 to the outlet end 121c of the control valve 121, and opens the control valve 121 using the handle 121a to draw and direct the additional flow of the filtered water from the refrigerator 100 to the external appliance via the control valve 121 through the supplementary pipe 122. When the external appliance is filled with the filtered water from the refrigerator 100, the user may close the control valve 121 using the handle 121a and retain the supplementary pipe 122 as previously connected, or disconnect the supplementary pipe 122 and plug the outlet end 121c of the control valve 121 using the push-on cap 128 to shut off the flow of filtered water from the refrigerator 100. The refrigerator 100 further comprises a rear panel 202 with vents 203 positioned on the real wall 101a of the enclosure 101 as exemplarily illustrated in FIG. 2. A control box (not shown) comprising control circuitry and a microcontroller 501 exemplarily illustrated in FIG. 5, is accessible by removing the real panel 202 of the refrigerator 100.

Figure 3:
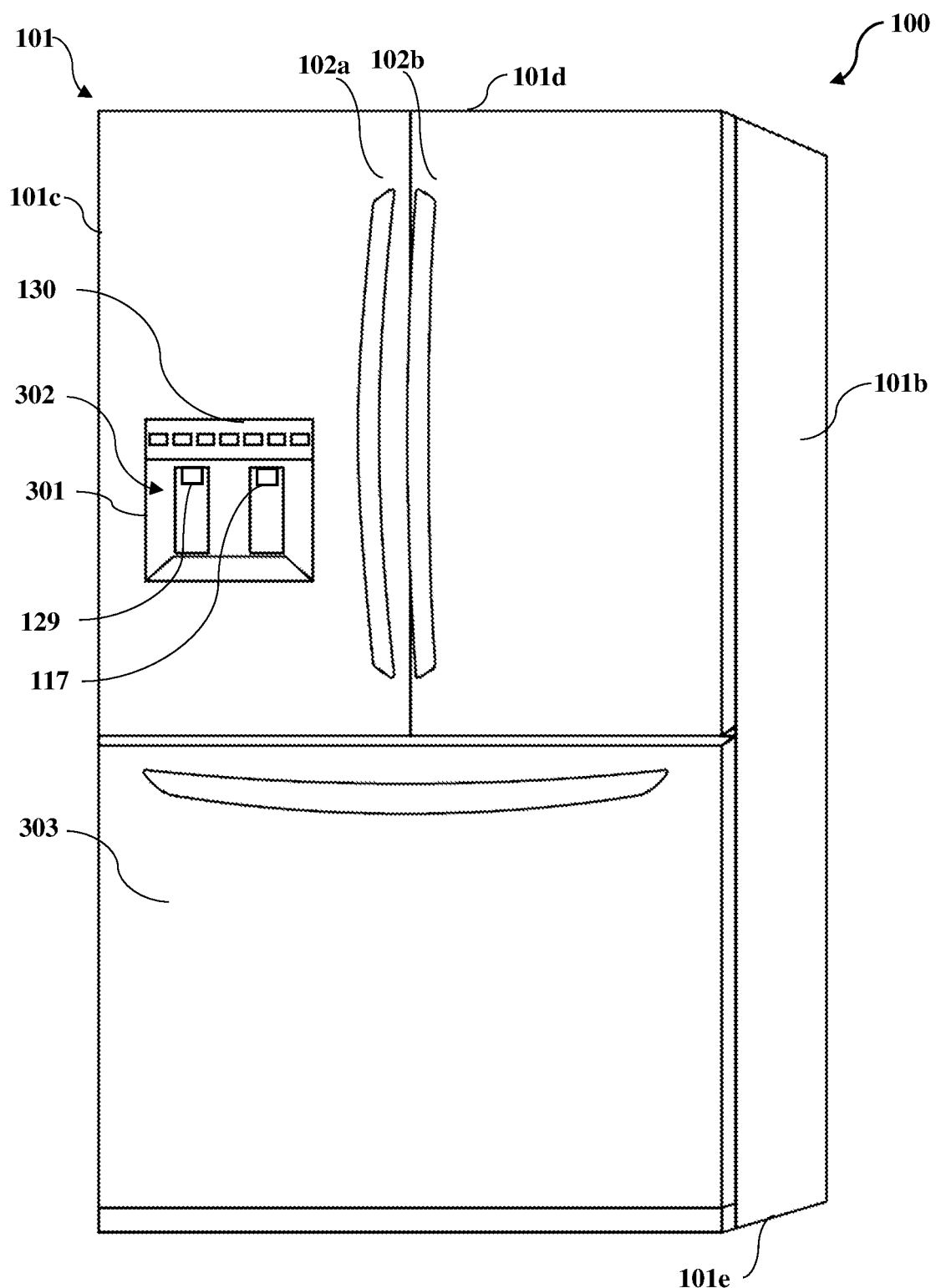
FIG. 3 exemplarily illustrates a front perspective view of the refrigerator comprising a water dispenser, an ice dispenser, and a control panel of an embodiment of the filtered water supply extension system, positioned on a front door of the refrigerator.

FIG. 3 exemplarily illustrates a front perspective view of the refrigerator 100 comprising a water dispenser 117, an ice dispenser 129, and a control panel 130 of an embodiment of the filtered water supply extension system 123, positioned on a front door 102a of the refrigerator 100. While the refrigerator 100 exemplarily illustrated in FIG. 3 shows a bottom freezer refrigerator configuration with two front doors 102a and 102b and a bottom freezer 303, the filtered water supply extension system 123 disclosed herein is configured to be positioned and to operate in refrigerators of multiple different configurations, for example, top freezer refrigerators, French door refrigerators, side-by-side refrigerators, single door refrigerators, flexible multiple door refrigerators, smart refrigerators, etc. The water dispenser 117, the ice dispenser 129, and the control panel 130 are positioned within a dispenser housing 301 mounted on the front door 102a of the refrigerator 100 as exemplarily illustrated in FIG. 3. The dispenser housing 301 comprises a recess 302 for placing a cup or a container to be filled with water through the water dispenser 117 or with ice cubes through the ice dispenser 129. In an embodiment, the control panel 130 is positioned on a front section, for example, the front door 102a of the refrigerator 100, above the recess 302 of the dispenser housing 301. In other embodiments, the control panel 130 is positioned at any accessible location on one or more of the front doors 102a and 102b of the refrigerator 100 or any front section such as a front wall of the refrigerator 100 for convenient access and selection of options by a user.

When a switch (not shown) for the water dispenser 117 is activated via the control panel 130, a voltage is applied to the solenoid valve 109 operably coupled to the water storage container 115, causing the solenoid valve 109 to open and supply the filtered water to the water storage container 115 via the second supply line 114 and in turn to the water dispenser 117 via the third supply line 116 as exemplarily illustrated in FIG. 1. In an embodiment, when the switch for the water dispenser 117 is activated via the control panel 130, the filtered water stored in the water storage container 115 is automatically supplied to the water dispenser 117 in the dispenser housing 301 via the third supply line 116. The ice maker 112 in the refrigerator 100 exemplarily illustrated in FIG. 1 uses, for example, about 120 Volts of an alternating current to fill an ice tray 113 in the ice maker 112 exemplarily illustrated in FIG. 1, and eject ice cubes during an ice making process. The solenoid valve 108 that supplies filtered water from the water filter 105 to the ice maker 112 through the first supply line 111 exemplarily illustrated in FIG. 1, provides water pressure in a range of, for example, about 20 pounds per square inch (PSI) to about 120 PSI to the ice maker 112. For optimal ice making, a temperature of, for example, about −18 degree Celsius, is maintained in the ice maker 112. When the appropriate temperature is reached, a voltage is applied to the solenoid valve 108, which opens the solenoid valve 108 and supplies the filtered water to the ice tray 113 of the ice maker 112 via the first supply line 111. The filtered water begins to freeze in the ice tray 113. When the ice maker 112 detects that the cubes of water are frozen sufficiently, the ice maker 112 ejects the ice cubes into a storage bin, refills the ice tray 113 with the filtered water from the first supply line 111, and the cycle continues until the storage bin is filled to capacity. The ice maker 112 dispenses the ice cubes through the ice dispenser 129 in the dispenser housing 301 as exemplarily illustrated in FIG. 3.

Figure 4A:
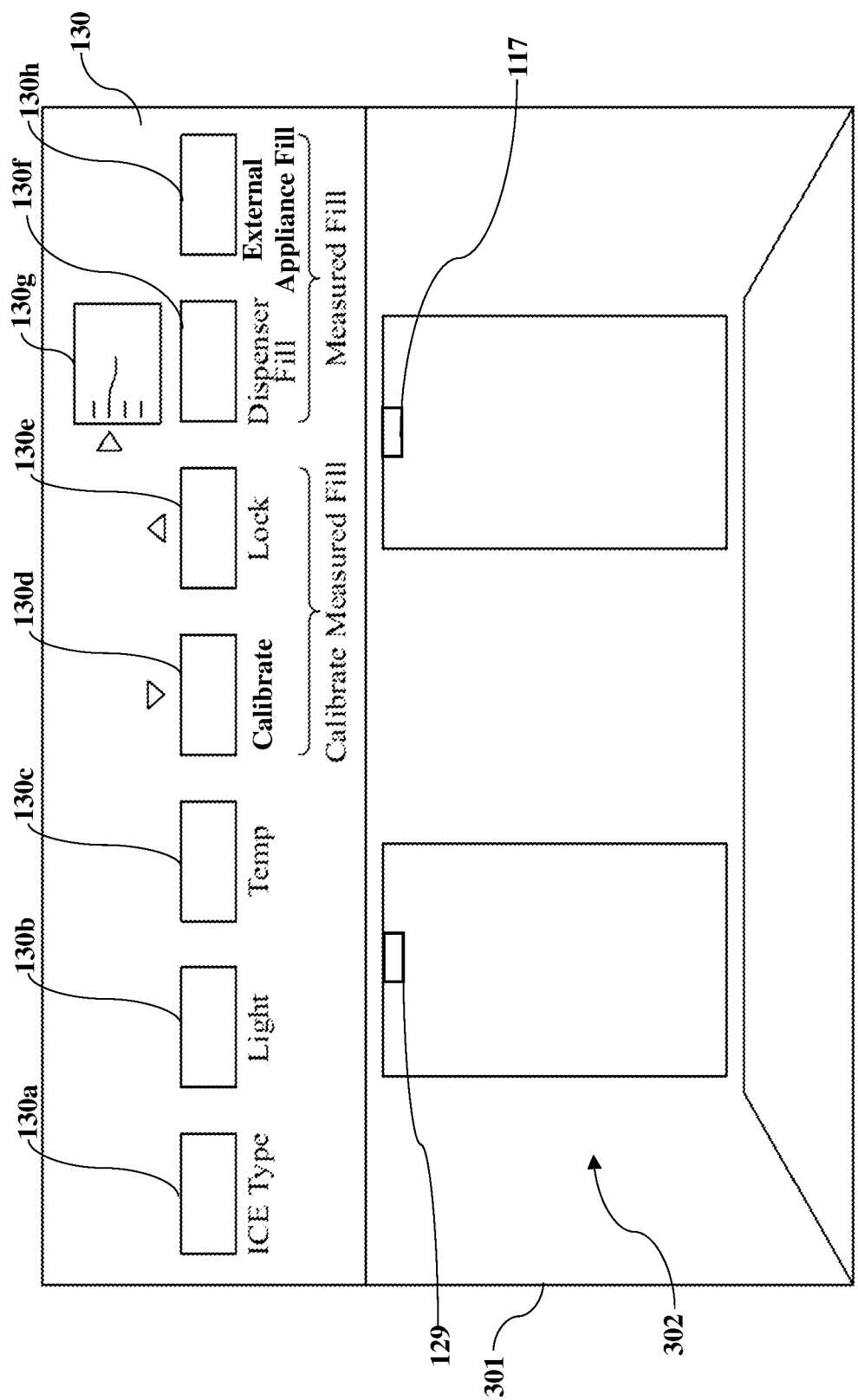
FIGS. 4A-4B exemplarily illustrate front elevation views of a dispenser housing of the refrigerator comprising embodiments of the control panel with measured fill options.
Figure 4B:
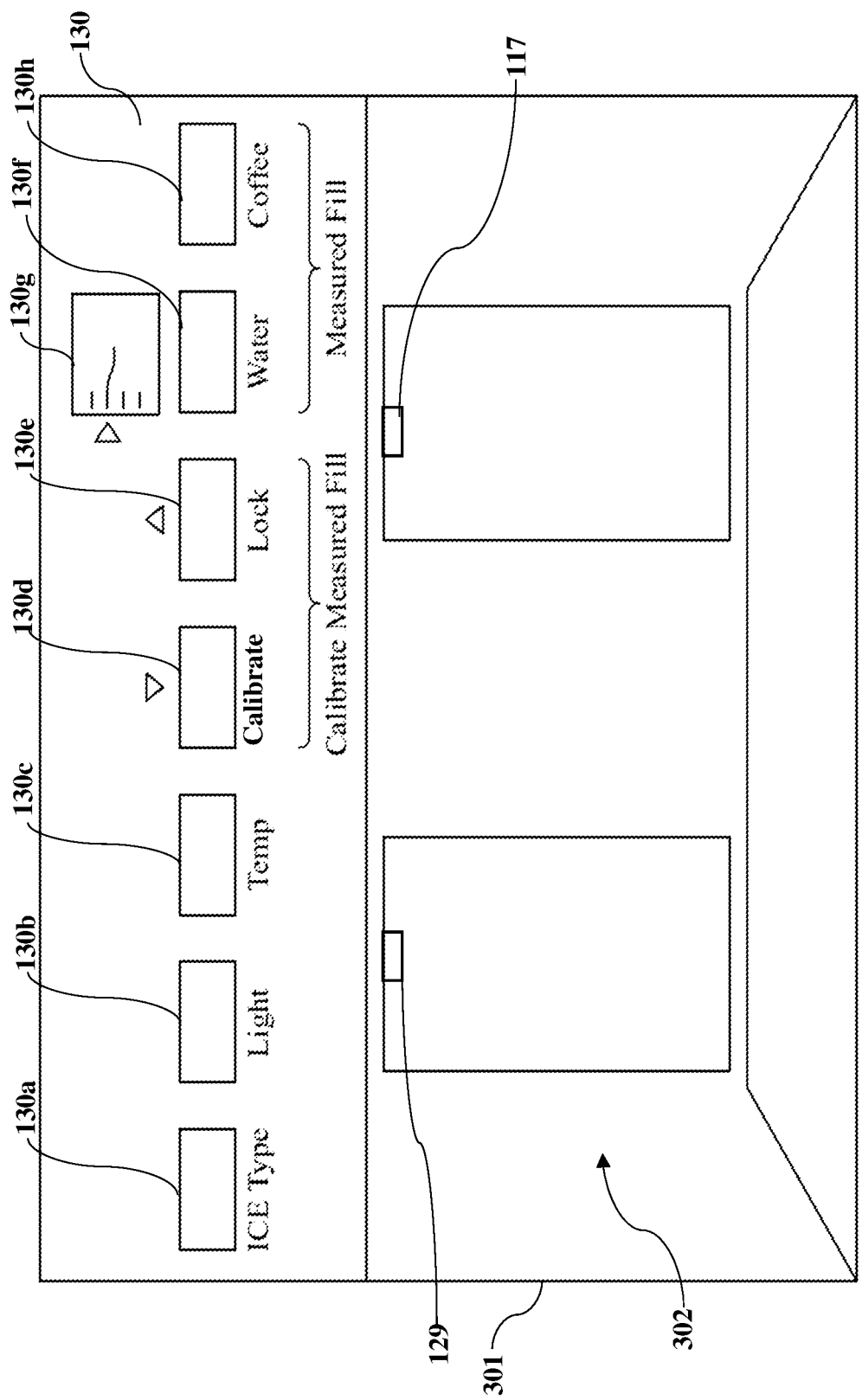

In an embodiment, the control panel 130 comprises a user interface, for example, a graphical user interface (GUI), with separate measured fill options for selectively controlling the filtered water flowing through the valve assembly 107 to at least one external appliance and the internal appliances, for example, the ice maker 112, the water storage container 115, the water dispenser 117, etc., as disclosed in the description of FIGS. 4A-4B. The external appliance leverages the separate measured fill option of the refrigerator 100 to obtain a selected quantity of water, for example, with the press of a button or a touch of a user interface element on the user interface of the control panel 130.

FIGS. 4A-4B exemplarily illustrate front elevation views of the dispenser housing 301 of the refrigerator 100 shown in FIG. 3, comprising embodiments of the control panel 130 with measured fill options. The control panel 130 is positioned above the recess 302 of the dispenser housing 301. The recess 302 of the dispenser housing 301 allows a user to access the water dispenser 117 and the ice dispenser 129 of the refrigerator 100 exemplarily illustrated in FIG. 1 and FIG. 3, that dispense filtered water and ice cubes or crushed ice respectively. The user may place a cup in the recess 302 of the dispenser housing 301 and fill the cup with the filtered water dispensed through the water dispenser 117 or with the ice cubes or crushed ice dispensed through the ice dispenser 129.

In addition to providing a measured fill option for dispensing a measured quantity of filtered water through the water dispenser 117 positioned in the dispenser housing 301 of the refrigerator 100 exemplarily illustrated in FIG. 3, the control panel 130 comprises an additional measured fill option for separately dispensing a measured quantity of filtered water as selected by the user to one or more external appliances from the refrigerator 100. As exemplarily illustrated in FIGS. 4A-4B, the control panel 130 comprises options for selecting a type of ice such as crushed ice, ice cubes, etc., a measured fill option for dispensing a measured quantity of filtered water through the water dispenser 117, and an additional measured fill option for drawing and directing a measured quantity of filtered water into an external appliance, for example, a coffee maker 124, positioned external to the refrigerator 100 as exemplarily illustrated in FIG. 1. The filtered water supply extension system 123 comprising the extension member 118 and the flow control device 120 as exemplarily illustrated in FIGS. 1-2, allows a measured quantity of filtered water to be drawn and directed to the external appliance based on user inputs received via the control panel 130.

Examples of other options provided on the control panel 130 comprise a light emitting diode (LED) indicator 130b for indicating status of different functions in the refrigerator 100 such as a refrigerator door being left open, a high temperature, ON/OFF status, etc.; a temperature indicator 130c for indicating the temperature of the filtered water being dispensed; options to calibrate the measured quantity of filtered water to be dispensed into a cup or a container via the water dispenser 117 at the front door 102a of the refrigerator 100 exemplarily illustrated in FIG. 3, and into the external appliance via the flow control device 120 positioned at the rear wall 101a of the refrigerator 100 exemplarily illustrated in FIGS. 1-2, etc. In an embodiment, the control panel 130 comprises user interface elements, for example, touch pads, switches, buttons, voice-operable elements, sensors, etc., labeled as "ice type" 130a, "dispenser fill" or "water" 130f, "external appliance fill" or "coffee" 130h, and "calibrate" 130d, "lock" 130e, etc., as exemplarily illustrated in FIGS. 4A-4B, to allow the user to select the different options disclosed above. In an embodiment, the "dispenser fill" user interface element 130f is labeled as "water" on the control panel 130 as exemplarily illustrated in FIG. 4B, for indicating an option to fill filtered water through the water dispenser 117. Similarly, in an embodiment, the "external appliance fill" user interface element 130h is labeled as "coffee" on the control panel 130 as exemplarily illustrated in FIG. 4B, to indicate an option to fill filtered water into an external appliance, for example, the coffee maker 124 exemplarily illustrated in FIG. 1 and FIG. 5. The "dispenser fill" or "water" option and the "external appliance fill" or "coffee" option constitute the measured fill options on the control panel 130. The control panel 130 further comprises a fill indicator 130g to indicate the quantity of fill selected by the user.

In an example, the user may select the "ice type" user interface element 130a on the control panel 130 for activating the ice dispenser 129 to fill ice cubes or crushed ice into a cup or a container placed below the ice dispenser 129 in the recess 302 of the dispensing housing 301. In another example, the user may increase or decrease the quantity of filtered water to be dispensed into a cup or a container by selecting the "dispenser fill" user interface element 130f and the "calibrate" and "lock" user interface elements 130d and 130e respectively, on the control panel 130. In another example, the user may increase or decrease the number of cups of filtered water to be separately filled into the coffee maker 124 positioned external to the refrigerator 100 by selecting the additional "external appliance fill" or "coffee" user interface element 130h and the "calibrate" and "lock" user interface elements 130d and 130e respectively, on the control panel 130. The control panel 130 allows a preconfigured number of cups, for example, about 1 cup to about 12 cups, of filtered water to be filled into the external appliance. For example, through the "external appliance fill" or "coffee" user interface element 130h and the measured fill options selected through the "calibrate" and "lock" user interface elements 130d and 130e respectively, on the control panel 130, the control panel 130 allows the user to select the number of cups of filtered water required to be filled in the coffee maker 124. Once selected, the extension member 118 of the filtered water supply extension system 123 draws and directs the selected number of cups of filtered water to the flow control device 120 positioned at the rear wall 101a of the refrigerator 100 via the extension pipe 119, and from the flow control device 120 into the coffee maker 124 through the supplementary pipe 122 connected to the flow control device 120 and the coffee maker 124 as exemplarily illustrated in FIG. 1. The filtered water supply extension system 123 automatically terminates the flow of the filtered water into the coffee maker 124 when the selected quantity is reached. The automatic termination of the flow of the filtered water eliminates the need to manually close the control valve 121 of the flow control device 120 exemplarily illustrated in FIGS. 1-2, to reach the quantity of filtered water needed in the coffee maker 124.

In an embodiment, one or more flow sensors and/or timers (not shown) are operably coupled to the valve assembly 107 for monitoring the flow of filtered water through the solenoid valves 108, 109, and 110 exemplarily illustrated in FIG. 1. The microcontroller 501 exemplarily illustrated in FIG. 5, processes inputs received from the flow sensor(s) and/or the timer(s) to control the quantity of filtered water flowing through the solenoid valves 108, 109, and 110. In an embodiment, the microcontroller 501 tracks the quantity of water measured by the flow sensor(s) and/or the timer(s) and communicates the information to the control panel 130 for display on the user interface. In another embodiment, one or more flow sensors and timer mechanisms (not shown) are integrated into the microcontroller 501 for measuring the selected quantity of filtered water to be dispensed through the solenoid valves 108, 109, and 110. For example, on receiving a user input of a selected number of cups of filtered water to be filled into the coffee maker 124, from the control panel 130, the flow sensor and the timer mechanism integrated into the microcontroller 501 measure the selected quantity of filtered water and energize the solenoid valve 110 to dispense the measured quantity of filtered water into the coffee maker 124 via the flow control device 120 as disclosed above. On being activated by the user, the "water" and "coffee" user interface elements 130f and 130h on the control panel 130 respectively, send a signal to the microcontroller 501, and in turn, to the solenoid valves 109 and 110 to allow the flow of the filtered water to the water dispenser 117 and the flow control device 120 respectively, to fill a cup placed in the recess 302 of the dispenser housing 301 and the coffee maker 124 respectively. In an embodiment, timer controls (not shown) in the microcontroller 501 automatically shut off the flow of the filtered water to the water dispenser 117 and the coffee maker 124 at the quantity selected by the user at the control panel 130 as disclosed in the description of FIG. 5.

An example of the sequence of operations for filling an external appliance, for example, a carafe 125 of a beverage maker such as a coffee maker 124 exemplarily illustrated in FIG. 1 and FIG. 5, or a tea maker, a reusable water bottle, etc., is provided herein. A user touches the "external appliance fill" user interface element 130h representing the additional measured fill option on the control panel 130 exemplarily illustrated in FIG. 4A. After touching the "external appliance fill" user interface element 130h on the control panel 130, the control panel 130 displays an up and down arrow thereon. The up and down arrow allows the user to select a desired quantity of filtered water, for example, the number of cups of filtered water, that needs to be dispensed from the control valve 121 of the flow control device 120 exemplarily illustrated in FIGS. 1-2, into the carafe 125. The user selects the desired quantity of filtered water using the "calibrate" user interface element 130d and the "lock" user interface element 130e on the control panel 130. The selectable quantity is, for example, about 40 ounces to up to about 12 cups. The microcontroller 501, in communication with the control panel 130, automatically shut offs the filtered water supply from the control valve 121 when the selected quantity is reached as disclosed in the description of FIG. 5. This process is executed by a single circuit activated at the control panel 130 and then through the microcontroller 501, which sends a voltage to the single solenoid valve 110 in the valve assembly 107 operably coupled to the control valve 121 of the flow control device 120 at the rear wall 101a of the refrigerator 100 exemplarily illustrated in FIG. 1.

On receiving the voltage, the solenoid valve 110 opens and dispenses the selected quantity of filtered water to the control valve 121 of the flow control device 120 via the extension pipe 119, and from the control valve 121 into the carafe 125 via the supplementary pipe 122. The microcontroller 501, in communication with the control panel 130, automatically shut offs the additional flow of filtered water from the control valve 121 into the carafe 125 via the supplementary pipe 122 when the selected quantity is reached. The measured fill option for dispensing a measured quantity of the filtered water into an external appliance, for example, the carafe 125 of the coffee maker 124, via the control valve 121 with an automatic shutoff of the filtered water supply is independent of the measured fill option for dispensing a measured quantity of the filtered water through the water dispenser 117 positioned in the dispenser housing 301 on the front door 102*a* of the refrigerator 100. The filtered water supply extension system 123 has its own separated solenoid valve 110 for feeding a measured quantity of the filtered water through the extension pipe 119 and via the control valve 121 of the flow control device 120 into the external appliance through the supplementary pipe 122. Moreover, the water dispenser 117 has its own separated solenoid valve 109 in the valve assembly 107 to feed the filtered water through the water storage container 115 located within the refrigerator 100 as exemplarily illustrated in FIG. 1, for cooling. From the water storage container 115, the cooled, filtered water is then dispensed to a spout of the water dispenser 117 held under an opening in the dispenser housing 301 on the front door 102*a*. Furthermore, the ice maker 112 also has its own solenoid valve 108 in the same valve assembly 107 to feed the filtered water to the ice maker 112 when the ice maker 112 is in its harvest mode.

FIG. 5 exemplarily illustrates a schematic showing connections of a microcontroller 501 to the valve assembly 107 and the control panel 130 of an embodiment of the filtered water supply extension system 123. The microcontroller 501 is embedded at a predetermined location in the refrigerator 100 for executing control functions and managing control operations of the refrigerator 100. In an embodiment, the microcontroller 501 is integrated into a motherboard of the refrigerator 100. The motherboard is positioned at a bottom rear location of the refrigerator 100. In an embodiment, the microcontroller 501 is integrated into a printed circuit board (PCB) positioned at any location, for example, a front door 102*a* of the refrigerator 100 exemplarily illustrated in FIG. 1, a freezer compartment door, the rear wall 101*a* of the refrigerator 100 exemplarily illustrated in FIG. 2, the control box (not shown) accessible via the rear panel 202 exemplarily illustrated in FIG. 2, etc., or other locations of the refrigerator 100. The microcontroller 501 comprises a processor, for example, a central processing unit (CPU), a memory, peripherals such as data converters, internal oscillators, timers, amplifiers, comparators, input/output (I/O) circuitry, etc., and support circuitry such as power supply circuitry.

In an embodiment as exemplarily illustrated in FIG. 5, the microcontroller 501 is operably connected to the control panel 130 and the valve assembly 107 within the refrigerator 100. In an embodiment, the microcontroller 501 is also operably connected to circuitry of internal appliances of the refrigerator 100. For example, the microcontroller 501 is operably connected to circuitry 510 of the ice maker 112 via a control line 508 as exemplarily illustrated in FIG. 5, for triggering and controlling functions of the ice maker 112. The microcontroller 501 is configured to process user inputs received via the control panel 130 and operate the valve assembly 107 for drawing and directing a measured quantity of the filtered water to at least one external appliance, for example, a coffee maker 124, and to one or more internal appliances, for example, a water storage container 115, a water dispenser 117, the ice maker 112, etc. For purposes of illustration, the disclosure herein refers to the external appliance being a coffee maker 124; however, the filtered water supply extension system 123 is configured to be used to draw and direct a measured quantity of the filtered water to any external appliance, for example, any beverage maker such as a tea maker, a juice maker, etc., a kettle, a water bottle, an external fluid dispenser, a liquid container, a pitcher, etc. The processor of the microcontroller 501 performs arithmetic and logic operations, manages data flow, and generates control signals in accordance with a sequence of instructions programmed for user inputs received via the control panel 130. The memory of the microcontroller 501 stores data and computer program instructions to be executed by the processor of the microcontroller 501.

As exemplarily illustrated in FIG. 5, a load (L) wire 502 and a neutral (N) wire 503 of an alternating current (AC) power circuit are electrically connected to the microcontroller 501 for powering the microcontroller 501 and for providing power to the solenoid valves 108, 109, and 110 of the valve assembly 107. The load wire 502 provides an electric source, for example, an alternating current. The neutral wire 503 completes the flow of electricity and acts as a return path for the alternating current of the load wire 502. The load wire 502 carries the alternating current from an AC power supply, which reaches the solenoid valves 108, 109, and 110 through the neutral wire 503. The neutral wire 503 is connected to the earth ground. The neutral wire 503 is electrically connected to the solenoid valves 108, 109, and 110 via respective lines 503*a*, 503*b*, and 503*c* as exemplarily illustrated in FIG. 5. Furthermore, input lines corresponding to different options of the control panel 130 are electrically connected to the microcontroller 501. For example, the input lines 504 and 506 corresponding to the "water" option associated with the water dispenser 117 and the "coffee" option associated with the coffee maker 124 respectively, are electrically connected to the microcontroller 501. Output lines 505 and 507 associated with the internal water dispenser 117 and the external coffee maker 124 are electrically connected from the microcontroller 501 to the respective solenoid valves 109 and 110 in the valve assembly 107. The processor of the microcontroller 501 processes and interprets the user inputs received from the control panel 130 via the I/O peripherals of the microcontroller 501. The microcontroller 501 stores the user input data in the memory. The processor accesses the user input data from the memory and based on the instructions stored in its program memory, interprets the user input data, and executes appropriate actions via the I/O peripherals.

As exemplarily illustrated in FIG. 5, the valve assembly 107 comprises, for example, three solenoid valves, that is, the first solenoid valve 108 operably coupled to the ice maker 112 via the first supply line 111; the second solenoid valve 109 operably coupled to the water storage container 115 via the second supply line 114; and the third solenoid valve 110 configured as the extension member 118 of the filtered water supply extension system 123, the extension member 118 being operably coupled to the flow control device 120 of the filtered water supply extension system 123 via the extension pipe 119. The water storage container 115 is operably coupled to the water dispenser 117 positioned in the dispenser housing 301 via the third supply line 116 as exemplarily illustrated in FIG. 5. The flow control device 120 comprising the control valve 121, for example, the shutoff valve, is operably coupled to the coffee maker 124 via the supplementary pipe 122 for directing an additional flow of filtered water from the water filter 105 of the refrigerator 100 to the coffee maker 124, without interrupting a regular flow of filtered water from the water filter 105 to the internal appliances, for example, the ice maker 112 and the water dispenser 117 via the water storage container 115 of the refrigerator 100. The inlet pipe 104 of the water filter 105 is connected to the control valve 103 of an external water supply system (not shown) and the outlet pipe 106 of the water filter 105 is connected to the valve assembly 107 as exemplarily illustrated in FIG. 5.

The control panel 130 allows a user to select measured fill options for filling a cup through the water dispenser 117 and for filling a carafe 125 of the coffee maker 124. For example, when the user selects the "water" option by touching the "water" user interface element 130f and the measured fill options, that is, the "calibrate" and "lock" user interface elements 130d and 130e respectively, on the control panel 130 exemplarily illustrated in FIG. 4B, to lock in the measured quantity of filtered water required for filling the cup placed in the recess 302 of the dispenser housing 301, the microcontroller 501 receives the user input via the input line 504 and energizes the corresponding solenoid valve 109 by applying a voltage to the corresponding output line 505. When the solenoid valve 109 is energized, the solenoid valve 109 opens and directs the measured quantity of filtered water received from the water filter 105 to the water storage container 115 via the second supply line 114, and in turn, to the water dispenser 117 via the third supply line 116. The water dispenser 117 then dispenses the measured quantity of the filtered water into the cup. The water dispenser 117, in communication with the microcontroller 501, automatically shuts off when the selected quantity of filtered water is filled in the cup. In an embodiment, the microcontroller 501 de-energizes the corresponding solenoid valve 109 to shut off the flow of filtered water when the selected quantity of filtered water is dispensed through the water dispenser 117 into the cup.

In another example, if the user wants to fill the carafe 125 of the coffee maker 124 placed at a countertop 126 near the refrigerator 100 as exemplarily illustrated in FIG. 1, the user connects the first end 122a of the supplementary pipe 122 to the flow control device 120 positioned at the rear wall 101a of the refrigerator 100 and the second end 122b of the supplementary pipe 122 to the coffee maker 124 for filling the carafe 125. The user then selects the "coffee" option by touching the "coffee" user interface element 130h and the measured fill options, that is, the "calibrate" and "lock" user interface elements 130d and 130e respectively, on the control panel 130 exemplarily illustrated in FIG. 4B, to lock in the measured quantity of filtered water, for example, 3 cups to 4 cups, required for filling the carafe 125 of the coffee maker 124. The microcontroller 501 receives the user input via the input line 506 and energizes the corresponding solenoid valve 110 by applying a voltage to the corresponding output line 507. When the solenoid valve 110 is energized, the solenoid valve 110 opens and directs the measured quantity of filtered water received from the water filter 105 to the flow control device 120 via the extension pipe 119, and in turn, to the carafe 125 of the coffee maker 124 via the supplementary pipe 122. The flow control device 120, in communication with the microcontroller 501, automatically shuts off when the selected quantity, for example, 3 cups to 4 cups of filtered water, is filled in the carafe 125 of the coffee maker 124. In an embodiment, the microcontroller 501 de-energizes the corresponding solenoid valve 110 to shut off the flow of filtered water when the selected quantity of filtered water is dispensed into the carafe 125.

In another example, for making ice cubes in the ice maker 112, the microcontroller 501 energizes the corresponding solenoid valve 108 by applying a voltage to the corresponding output line 509. When the solenoid valve 108 is energized, the solenoid valve 108 opens and directs a flow of filtered water received from the water filter 105 to the ice maker 112 via the first supply line 111 for making ice cubes. The ice cubes are stored in a storage bin of the ice maker 112. In an embodiment, in response to a signal from the ice maker 112 transmitted via the control line 508, the microcontroller 501 is configured to open the corresponding solenoid valve 108 to fill the ice maker 112 and initiate an ice making cycle. In an embodiment, in response to a signal from the ice maker 112 transmitted via the control line 508, the microcontroller 501 is configured to close or de-energize the corresponding solenoid valve 108 to shut off the flow of filtered water when the required quantity of filtered water is dispensed into the ice maker 112. The control panel 130 allows the user to fill a cup with ice cubes through the ice dispenser 129 positioned in the dispenser housing 301. In an embodiment, the control panel 130 allows the user to fill the cup with a selected number of ice cubes through the ice dispenser 129. For example, when the user selects the "ice type" user interface element 130a and the measured fill options, that is, the "calibrate" and "lock" user interface elements 130d and 130e respectively, on the control panel 130 exemplarily illustrated in FIG. 4B, to lock in the number of ice cubes, for example, 3 ice cubes, required for filling the cup, the microcontroller 501 receives the user input from the control panel 130 and triggers the ice maker 112 to transfer the selected number of ice cubes from the storage bin to the ice dispenser 129. The ice dispenser 129 then dispenses the selected number of ice cubes into the cup. The ice dispenser 129, in communication with the microcontroller 501, automatically shuts off when the selected number of ice cubes is filled in the cup.

As disclosed above, the filtered water supply extension system 123 comprising the extension member 118, for example, the solenoid valve 110, and the flow control device 120, draws and directs an additional flow of filtered water from the water filter 105 to the carafe 125 of the coffee maker 124 positioned external to the refrigerator 100, without interrupting regular flows of filtered water from the water filter 105 to the ice maker 112, and to the water dispenser 117 via the water storage container 115 of the refrigerator 100. The microcontroller 501 is configured to communicate with different modules of the refrigerator 100, for example, the control panel 130, the ice maker 112, the valve assembly 107, etc., using different inter-module interface protocols. Communication circuitry, for example, bus bars, cables, interfaces on circuit printed circuit boards, etc., is configured to be arranged such that latency time meets user requirements for responses to user inputs. In another embodiment, instead of a single microcontroller 501, more than one microcontroller is integrated in the refrigerator 100 for controlling the different functions disclosed above.

Figure 6:
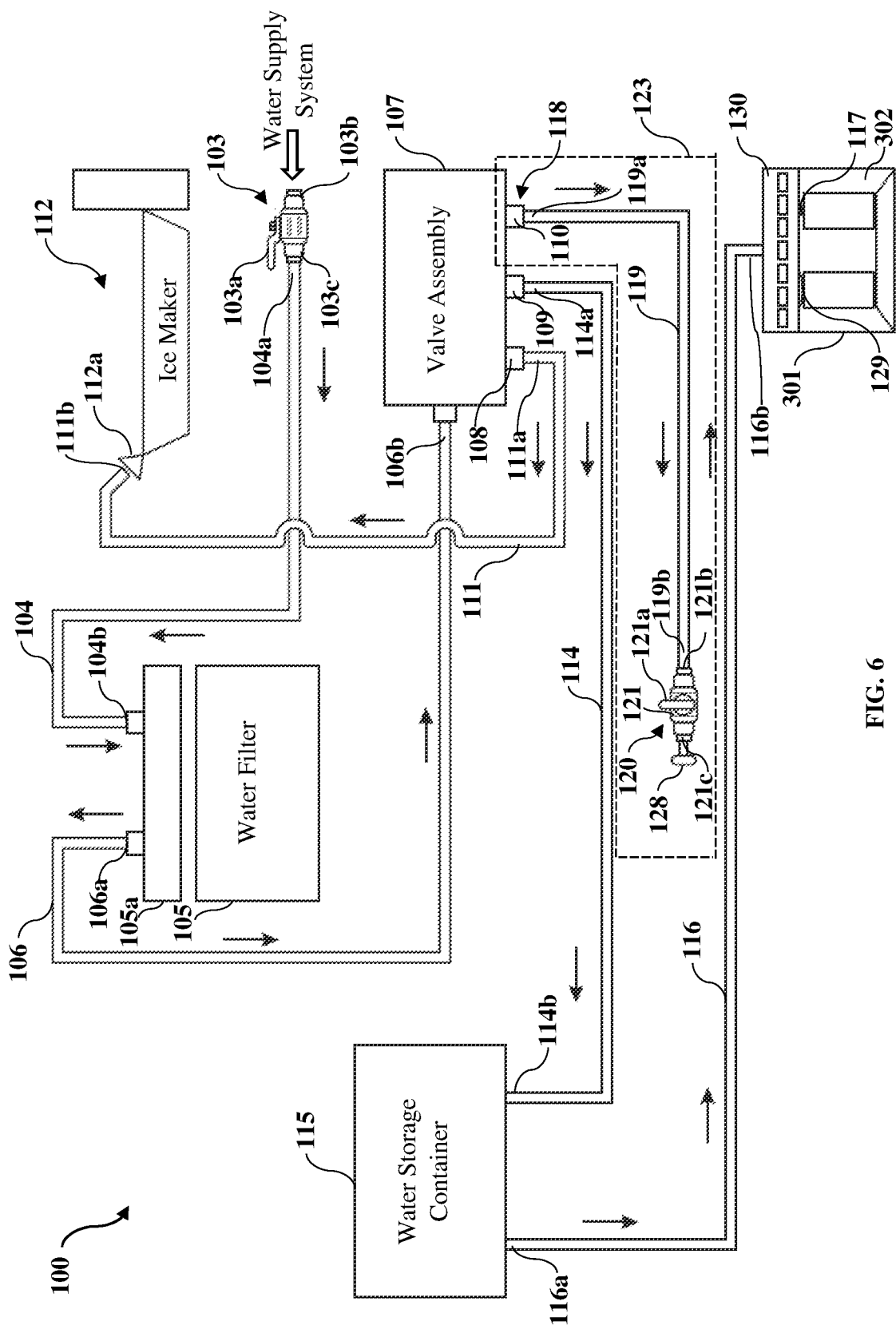
FIG. 6 exemplarily illustrates a schematic of an embodiment of the filtered water supply extension system operating in a first mode.

FIG. 6 exemplarily illustrates a schematic of an embodiment of the filtered water supply extension system 123 operating in a first mode. As exemplarily illustrated in FIG. 6, the control valve 103 of the external water supply system is operably coupled to the inlet pipe 104 of the water filter 105 of the refrigerator 100. That is, the first end 104a of the inlet pipe 104 is operably coupled to the outlet end 103c of the control valve 103, and the second end 104b of the inlet pipe 104 is operably coupled to the filter housing 105a of the water filter 105 as exemplarily illustrated in FIG. 6. The outlet pipe 106 of the water filter 105 is operably coupled to the valve assembly 107 comprising multiple solenoid valves, for example, three solenoid valves 108, 109, and 110, as exemplarily illustrated in FIG. 6. That is, the first end 106a of the outlet pipe 106 is operably coupled to the filter housing 105a of the water filter 105, and the second end 106b of the outlet pipe 106 is operably coupled to the valve assembly 107. A first solenoid valve 108 of the valve assembly 107 is operably coupled to the ice maker 112 via a first supply line 111. That is, a first end 111a of the first supply line 111 is operably coupled to the solenoid valve 108 of the valve assembly 107, and a second end 111b of the first supply line 111 is operably coupled to an inlet 112a of the ice maker 112. In an embodiment, a second solenoid valve 109 of the valve assembly 107 is operably coupled to the water storage container 115 via a second supply line 114. That is, a first end 114a of the second supply line 114 is operably coupled to the solenoid valve 109 of the valve assembly 107, and a second end 114b of the second supply line 114 is operably coupled to an inlet of the water storage container 115.

The water storage container 115 is configured to receive the filtered water drawn from the water filter 105 by the solenoid valve 109 via the outlet pipe 106 and store the filtered water. The water storage container 115 is further configured to direct a flow of the stored filtered water to another internal appliance, for example, the water dispenser 117 via a third supply line 116. An outlet of the water storage container 115 is operably coupled to the water dispenser 117 via the third supply line 116. That is, a first end 116a of the third supply line 116 is operably coupled to the outlet of the water storage container 115, and a second end 116b of the third supply line 116 is operably coupled to the water dispenser 117. The water storage container 115 is, therefore, operably coupled to the water dispenser 117 positioned in the dispenser housing 301 of the refrigerator 100. In another embodiment (not shown), the water storage container 115 is also configured to direct a flow of the stored filtered water to another internal appliance, for example, the ice maker 112. In this embodiment (not shown), instead of coupling the solenoid valve 109 to the ice maker 112, another supply line (not shown) operably couples the water storage container 115 to the ice maker 112.

A third solenoid valve 110 configured as the extension member 118 of the filtered water supply extension system 123 is operably coupled to the flow control device 120 via the extension pipe 119. In an embodiment, the flow control device 120 through which filtered water from the water filter 105 is directed to at least one external appliance, for example, a coffee maker 124, is positioned on the rear wall 101a of the refrigerator 100 as exemplarily illustrated in FIG. 2, while the water dispenser 117 through which filtered water is dispensed is positioned in the dispenser housing 301 on the front door 102a of the refrigerator 100 as exemplarily illustrated in FIG. 3 and FIG. 6. The extension member 118, therefore, draws and directs an additional flow of filtered water from the water filter 105 to the external appliance in the first mode, without interrupting a regular flow of filtered water from the water filter 105 to the water dispenser 117.

The flow of filtered water within and out of the refrigerator 100 is indicated by arrows in FIG. 6. Water from the external water supply system of a household or a building, flows into the inlet pipe 104 of the water filter 105 of the refrigerator 100 via the control valve 103. The filtered water produced by the water filter 105 then flows through the outlet pipe 106 of the water filter 105 and into the valve assembly 107. The first solenoid valve 108 of the valve assembly 107, on being energized by the microcontroller 501 exemplarily illustrated in FIG. 5, draws and directs a flow of filtered water to the ice maker 112 through the first supply line 111. The second solenoid valve 109 of the valve assembly 107, on being energized by the microcontroller 501, draws and directs another flow of filtered water to the water storage container 115 through the second supply line 114. The water storage container 115 stores the filtered water and supplies the filtered water to the water dispenser 117 in the dispenser housing 301 on the front door 102a of the refrigerator 100 through the third supply line 116 based on a measured fill option selected by a user on the control panel 130 positioned on the front door 102a of the refrigerator 100. In an embodiment, the water dispenser 117 allows the user to manually fill a cup placed in the dispenser housing 301 with the filtered water received from the water storage container 115. In the first mode, the third solenoid valve 110, that is, the extension member 118 of the filtered water supply extension system 123, on being energized by the microcontroller 501, draws and directs an additional flow of filtered water to the flow control device 120 at the rear wall 101a of the refrigerator 100 exemplarily illustrated in FIG. 1, through the extension pipe 119. The user connects the first end 122a of the supplementary pipe 122 to the control valve 121 of the flow control device 120 and connects the second end 122b of the supplementary pipe 122 to the external appliance, for example, a coffee maker 124, as exemplarily illustrated in FIG. 1. The user then operates the handle 121a of the control valve 121 to open the control valve 121 and allow the additional flow of the filtered water to fill the external appliance. In an embodiment, based on a separate measured fill option selected by the user on the control panel 130 positioned on the front door 102a of the refrigerator 100, the microcontroller 501, in communication with the control panel 130, automatically initiates and shuts off the additional flow of the filtered water to the external appliance, without requiring the user to open and close the control valve 121 respectively, by operating the handle 121a of the control valve 121, as disclosed in the detailed descriptions of FIGS. 4A-4B and FIG. 5. When the filtered water supply extension system 123 is not in use for filling the external appliance, the user disconnects the supplementary pipe 122 and plugs the outlet end 121c of the control valve 121 using the push-on cap 128 of the flow control device 120.

Figure 7:
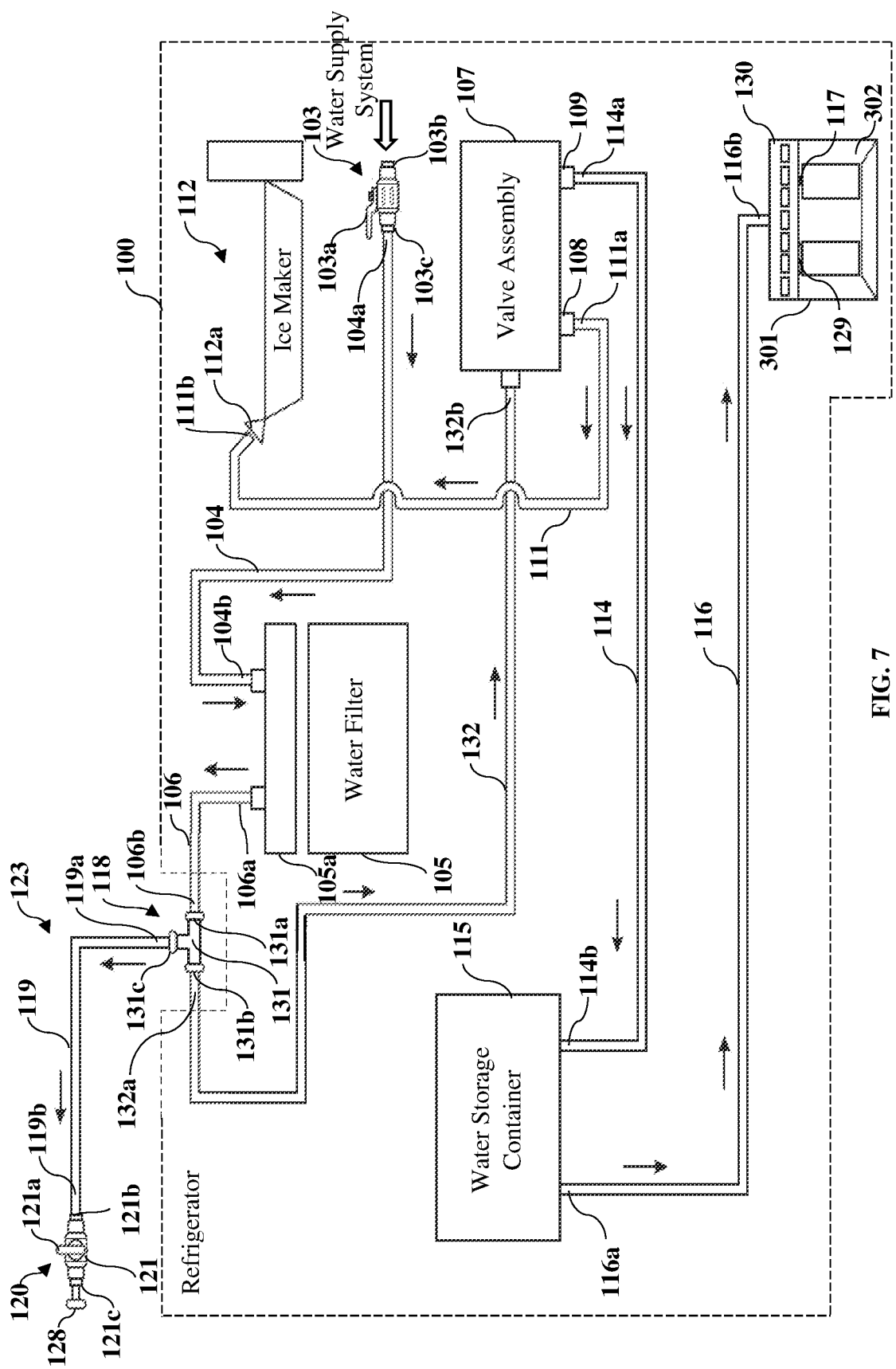
FIG. 7 exemplarily illustrates a schematic of an embodiment of the filtered water supply extension system operating in a second mode.

FIG. 7 exemplarily illustrates a schematic of an embodiment of the filtered water supply extension system 123 operating in a second mode. In the second mode as exemplarily illustrated in FIG. 7, the extension member 118 of the filtered water supply extension system 123 is a T-fitting member 131, also referred to as a T-connector, configured to draw and direct an additional flow of filtered water from the water filter 105 of the refrigerator 100 to at least one external appliance, for example, a coffee maker. The T-fitting member 131 is, for example, a ¼-inch T-connector, a ⁵⁄₁₆-inch T-connector, etc. As exemplarily illustrated in FIG. 7, the control valve 103 of the external water supply system is operably coupled to the inlet pipe 104 of the water filter 105 of the refrigerator 100. That is, the first end 104a of the inlet pipe 104 is operably coupled to the outlet end 103c of the control valve 103, and the second end 104b of the inlet pipe 104 is operably coupled to the filter housing 105a of the water filter 105. In the second mode, the outlet pipe 106 of the water filter 105 is operably coupled to the T-fitting member 131 of the filtered water supply extension system 123. The T-fitting member 131 comprises a first connection element 131a, a second connection element 131b, and a third connection element 131c. The first connection element 131a of the T-fitting member 131 is operably coupled to the water filter 105 via a first pipe, that is, the outlet pipe 106 of the water filter 105. That is, the second end 106b of the outlet pipe 106 is operably coupled to the first connection element 131a of the T-fitting member 131. The first connection element 131a of the T-fitting member 131 is configured to draw filtered water from the water filter 105 through the outlet pipe 106. In an embodiment as exemplarily illustrated in FIG. 7, the second connection element 131b of the T-fitting member 131 is operably coupled to the valve assembly 107 via a second pipe 132. That is, a first end 132a of the second pipe 132 is operably coupled to the second connection element 131b of the T-fitting member 131, and a second end 132b of the second pipe 132 is operably coupled to the valve assembly 107. In this embodiment, the second connection element 131b of the T-fitting member 131 is configured to direct a flow of the filtered water from the water filter 105 to the valve assembly 107 via the second pipe 132. The third connection element 131c of the T-fitting member 131 is positioned substantially perpendicular to the first connection element 131a and the second connection element 131b. The third connection element 131c of the T-fitting member 131 is operably coupled to the flow control device 120 via the extension pipe 119. That is, the first end 119a of the extension pipe 119 is operably coupled to the third connection element 131c of the T-fitting member 131, and the second end 119b of the extension pipe 119 is operably coupled to the control valve 121 of the flow control device 120. The third connection element 131c of the T-fitting member 131 is configured to direct the additional flow of the filtered water to the flow control device 120 through the extension pipe 119, and thereafter from the flow control device 120 to the external appliance through the supplementary pipe 122 exemplarily illustrated in FIG. 1.

In the embodiment exemplarily illustrated in FIG. 7, the valve assembly 107 comprises multiple solenoid valves, for example, two solenoid valves 108 and 109. A first solenoid valve 108 is operably coupled to the ice maker 112 and a second solenoid valve 109 is operably coupled to the water storage container 115. The first end 111a of the first supply line 111 is operably coupled to the first solenoid valve 108 of the valve assembly 107, and the second end 111b of the first supply line 111 is operably coupled to an inlet 112a of the ice maker 112. Similarly, the first end 114a of the second supply line 114 is operably coupled to the second solenoid valve 109 of the valve assembly 107, and the second end 114b of the second supply line 114 is operably coupled to the water storage container 115. The water storage container 115 is configured to store the filtered water. The water storage container 115 is operably coupled to the water dispenser 117 positioned in the dispenser housing 301 of the refrigerator 100, via the third supply line 116. That is, the first end 116a of the third supply line 116 is operably coupled to the water storage container 115, and the second end 116b of the third supply line 116 is operably coupled to the water dispenser 117. In an embodiment, the flow control device 120 through which the filtered water from the water filter 105 is directed to the external appliance is positioned on the rear wall 101a of the refrigerator 100 as exemplarily illustrated in FIG. 2, while the water dispenser 117 through which the filtered water is dispensed is positioned in the dispenser housing 301 positioned on the front door 102a of the refrigerator 100 as exemplarily illustrated in FIG. 3. The T-fitting member 131, therefore, draws and directs an additional flow of filtered water from the water filter 105 to the external appliance in the second mode, without interrupting a regular flow of filtered water from the water filter 105 to the water dispenser 117.

The flow of filtered water within and out of the refrigerator 100 is indicated by arrows in FIG. 7. Water, for example, from the external water supply system of a household or a building, flows into the inlet pipe 104 of the water filter 105 of the refrigerator 100 via the control valve 103. The filtered water produced by the water filter 105 then flows through the outlet pipe 106 of the water filter 105 and into the first connection element 131a of the T-fitting member 131. The T-fitting member 131 divides and directs the flow of the filtered water into the valve assembly 107 via the second connection element 131b of the T-fitting member 131 through the second pipe 132 and into the flow control device 120 via the third connection element 131c of the T-fitting member 131 through the extension pipe 119. The first solenoid valve 108 of the valve assembly 107 draws and directs the flow of the filtered water received from the second connection element 131b of the T-fitting member 131 through the second pipe 132 into the ice maker 112 through the first supply line 111. The second solenoid valve 109 of the valve assembly 107 draws and directs the flow of the filtered water received from the second connection element 131b of the T-fitting member 131 through the second pipe 132, to the water storage container 115 through the second supply line 114.

The water storage container 115 stores the filtered water and supplies the filtered water to the water dispenser 117 in the dispenser housing 301 on the front door 102a of the refrigerator 100 through the third supply line 116 based on a measured fill option selected by a user on the control panel 130 positioned on the front door 102a of the refrigerator 100 as disclosed in the detailed description of FIGS. 4A-4B. In an embodiment, the water dispenser 117 allows the user to manually fill a cup placed in the dispenser housing 301 with the filtered water received from the water storage container 115. The flow control device 120 of the filtered water supply extension system 123 at the rear wall 101a of the refrigerator 100 draws and directs the additional flow of the filtered water received from the third connection element 131c of the T-fitting member 131 through the extension pipe 119 to the external appliance via the supplementary pipe 122. The user connects the first end 122a of the supplementary pipe 122 to the control valve 121 of the flow control device 120 and connects the second end 122b of the supplementary pipe 122 to the external appliance as exemplarily illustrated in FIG. 1. The user then operates the handle 121a of the control valve 121 to open the control valve 121 and allow the additional flow of the filtered water to fill the external appliance. In an embodiment, based on a separate measured fill option selected by the user on the control panel 130 positioned on the front door 102a of the refrigerator 100, the microcontroller 501, in communication with the control panel 130, automatically initiates and terminates the additional flow of the filtered water to the external appliance without requiring the user to open and close the control valve 121 respectively, by operating the handle 121a of the control valve 121, as disclosed in the detailed descriptions of FIGS. 4A-4B and FIG. 5. The microcontroller 501, in communication with the control panel 130, automatically shuts off the additional flow of the filtered water to the external appliance when the selected quantity of the filtered water is filled in the external appliance. When the filtered water supply extension system 123 is not in use for filling the external appliance, the user disconnects the supplementary pipe 122 and plugs the outlet end 121c of the control valve 121 using the push-on cap 128 of the flow control device 120.

Figure 8:
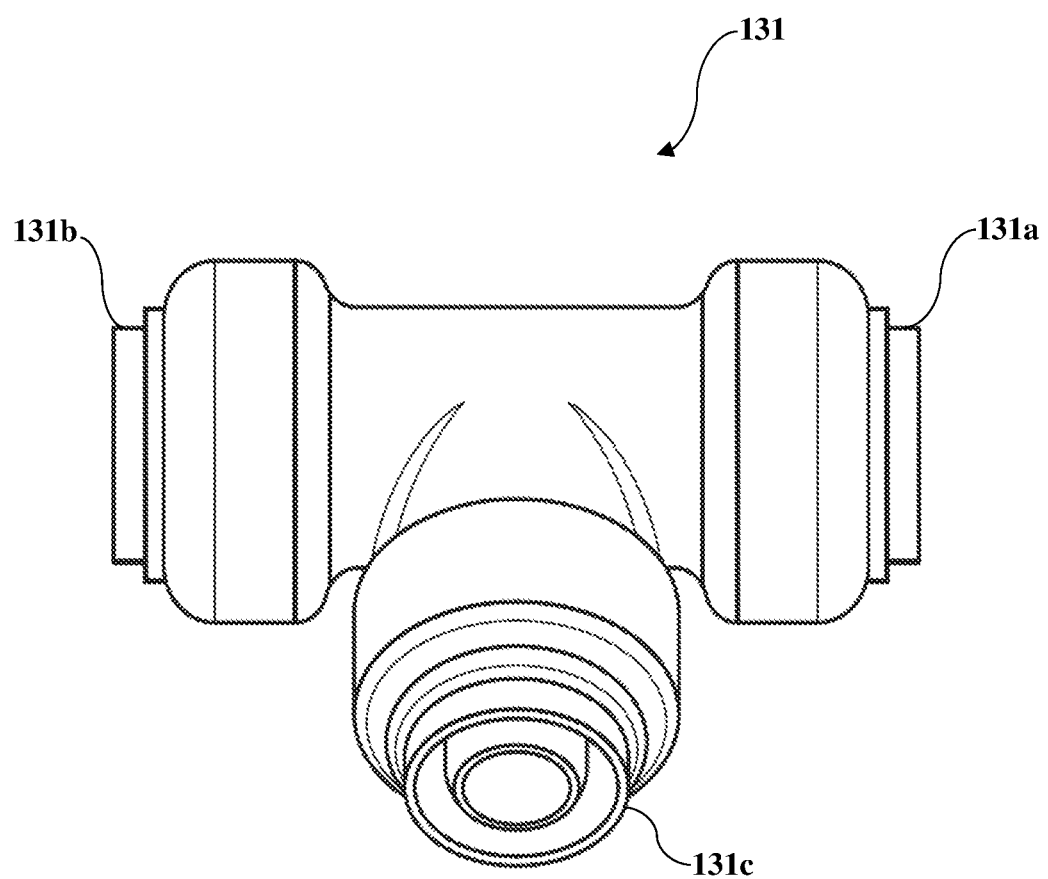
FIG. 8 exemplarily illustrates a perspective view of an extension member of an embodiment of the filtered water supply extension system.

FIG. 8 exemplarily illustrates a perspective view of an extension member 118 of an embodiment of the filtered water supply extension system 123 shown in FIG. 7. In an embodiment, the extension member 118 is a T-fitting member 131 configured to operate in the second mode. The T-fitting member 131 is a T-shaped connector comprising a first connection element 131a, a second connection element 131b, and a third connection element 131c as disclosed in the description of FIG. 7. In an embodiment, the T-fitting member 131 is a push fit T-connector. The second connection element 131b of the T-fitting member 131 extends in a direction opposite to the direction of the first connection element 131a of the T-fitting member 131, that is, at a 180-degree angle relative to the first connection element 131a. The third connection element 131c of the T-fitting member 131 is positioned substantially perpendicular to the first connection element 131a and the second connection element 131b. The first connection element 131a is configured as an inlet of the T-fitting member 131, whereas the second connection element 131b and the third connection element 131c are configured as outlets of the T-fitting member 131. The T-fitting member 131 is made from different materials, for example, aluminum, stainless steel, carbon steel, iron, plastic, brass, copper, rubber, etc.

Figure 10:
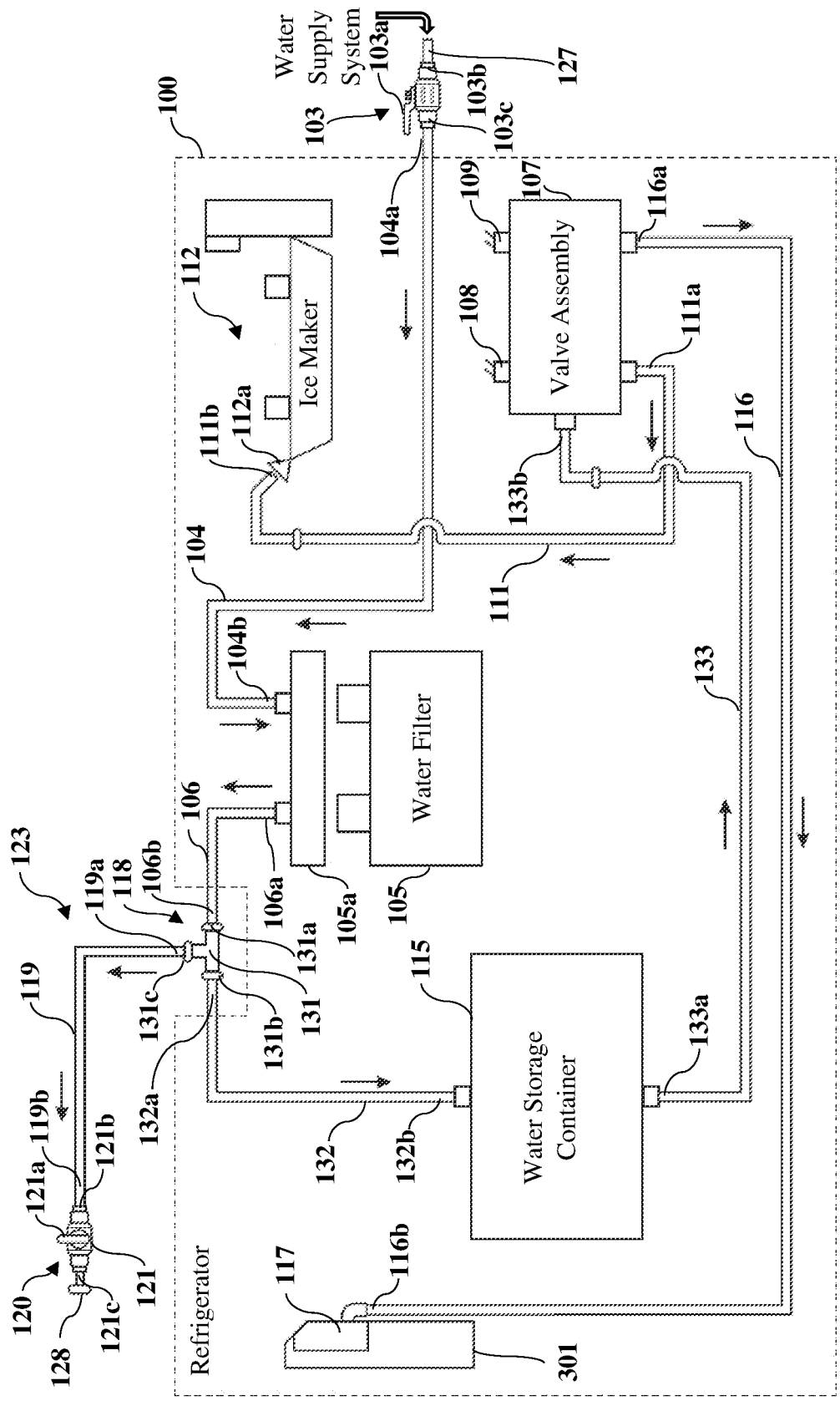
FIG. 10 exemplarily illustrates a schematic of another embodiment of the filtered water supply extension system operating in the second mode.

To incorporate the filtered water supply extension system 123 into the refrigerator 100 containing the water filter 105 exemplarily illustrated in FIG. 7 and FIG. 10, the outlet pipe 106 from the water filter 105 is cut and then joined via the first connection element 131a and the second connection element 131b of the T-fitting member 131. The extension pipe 119 is routed from the third connection element 131c of the T-fitting member 131 along the rear wall 101a of the refrigerator 100 and connected to the control valve 121 of the flow control device 120 as exemplarily illustrated in FIG. 7 and FIG. 10. The first connection element 131a of the T-fitting member 131 connects to one end 106b of the outlet pipe 106 of the water filter 105 of the refrigerator 100 as exemplarily illustrated in FIG. 7. In an embodiment, the second connection element 131b of the T-fitting member 131 connects to one end 132a of the second pipe 132 that connects to the valve assembly 107 as exemplarily illustrated in FIG. 7. In another embodiment, the second connection element 131b of the T-fitting member 131 connects to the water storage container 115 as exemplarily illustrated in FIG. 10. The third connection element 131c of the T-fitting member 131 connects to one end 119a of the extension pipe 119 that connects to the flow control device 120 of the filtered water supply extension system 123 as exemplarily illustrated in FIG. 7 and FIG. 10. The T-fitting member 131, therefore, forms a T-joint between the outlet pipe 106 of the water filter 105, the second pipe 132, and the extension pipe 119. The third connection element 131c of the T-fitting member 131 draws a portion of filtered water from the water filter 105 before the filtered water is supplied to other parts, for example, the ice maker 112, the water storage container 115, the water dispenser 117, etc., of the refrigerator 100 exemplarily illustrated in FIG. 7 and FIG. 10. Piping, for example, the extension pipe 119 with one end 119a connected to the third connection element 131c of the T-fitting member 131, transports the drawn portion of the filtered water out of the refrigerator 100 towards the external appliance receiving the drawn portion of the filtered water.

The T-fitting member 131 divides the flow of filtered water from the water filter 105 to create one flow of the filtered water to the valve assembly 107 as exemplarily illustrated in FIG. 7, and in an embodiment, to the water dispenser 117 via the water storage container 115 as exemplarily illustrated in FIG. 10, and an additional flow of the filtered water to the external appliance via the flow control device 120. Filtered water is drawn from the water filter 105 into the first connection element 131a of the T-fitting member 131 through the outlet pipe 106 of the water filter 105 and in an embodiment, is directed to the valve assembly 107 through the second pipe 132 as exemplarily illustrated in FIG. 7. In another embodiment, the filtered water is drawn from the water filter 105 into the first connection element 131a of the T-fitting member 131 through the outlet pipe 106 of the water filter 105 and is directed to the water storage container 115 through the second pipe 132 as exemplarily illustrated in FIG. 10. An additional flow of filtered water is drawn from the water filter 105 into the third connection element 131c of the T-fitting member 131 and directed to the flow control device 120 through the extension pipe 119. From the flow control device 120, the additional flow of filtered water is directed to the external appliance through the supplementary pipe 122 as disclosed in the description of FIG. 7. The control valve 121 of the flow control device 120 regulates the flow of the drawn portion of the filtered water into the external appliance through the supplementary pipe 122 connected to a water inlet of the external appliance.

Figure 9A:
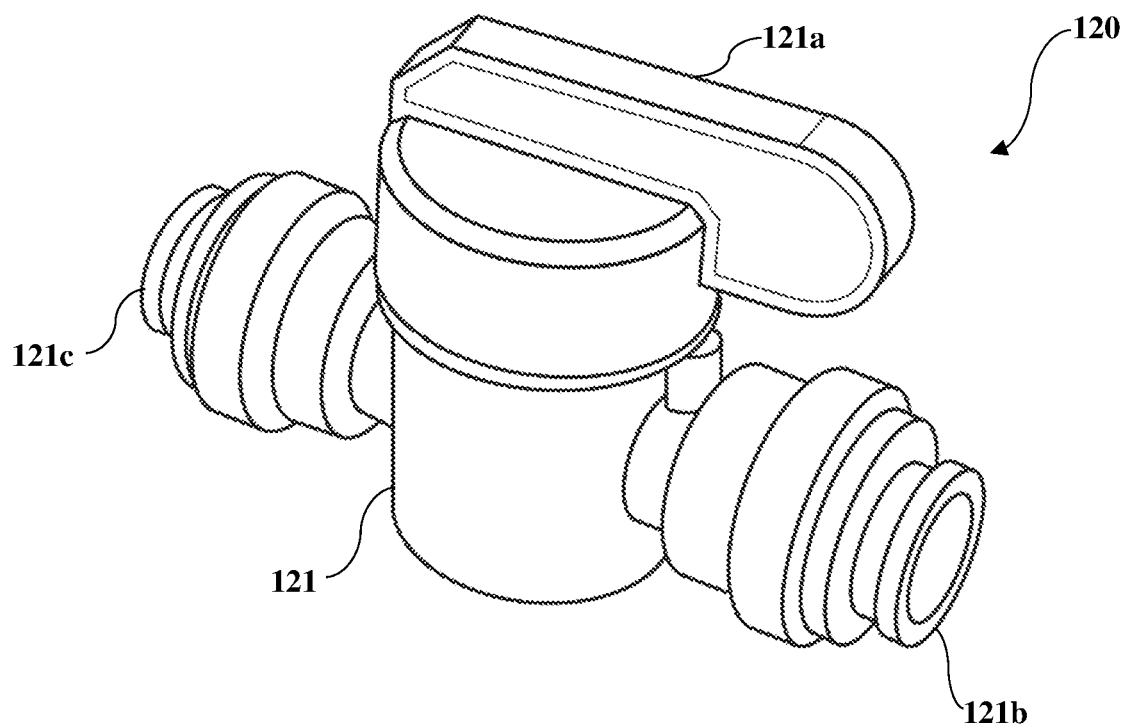
FIG. 9A exemplarily illustrates a perspective view of a control valve of a flow control device of an embodiment of the filtered water supply extension system.

FIG. 9A exemplarily illustrates a perspective view of a control valve 121 of the flow control device 120 of an embodiment of the filtered water supply extension system 123 shown in FIG. 1. In an embodiment, the control valve 121 is, for example, a shutoff valve, comprising a handle 121a such as a lever handle, an inlet end 121b, and an outlet end 121c as disclosed in the description of FIG. 1. The inlet end 121b of the control valve 121 connects to one end 119a of the extension pipe 119 that connects to the extension member 118 inside the refrigerator 100 exemplarily illustrated in FIG. 1, FIGS. 6-7, and FIGS. 10-11. The outlet end 121c of the control valve 121 extends outwardly from the rear wall 101a of the refrigerator 100 as exemplarily illustrated in FIG. 2, to connect to one end 122a of the supplementary pipe 122 that connects to the external appliance, for example, a coffee maker 124, as exemplarily illustrated in FIG. 1. The control valve 121 is made, for example, from copper, brass, plastic, polypropylene, etc. The flow control device 120 is positioned and extends outwardly from the rear wall 101a of the refrigerator 100 as exemplarily illustrated in FIG. 2. In an embodiment, a user manually turns the handle 121a to open and close the control valve 121, and accordingly to allow and disallow the additional flow of filtered water respectively, to the external appliance through the supplementary pipe 122. In another embodiment, the control valve 121 is left open and the additional flow of the filtered water in a selected and measured quantity is automatically initiated and terminated by the microcontroller 501 in communication with the control panel 130 and the valve assembly 107 as exemplarily illustrated in FIG. 5.

Figure 9B:
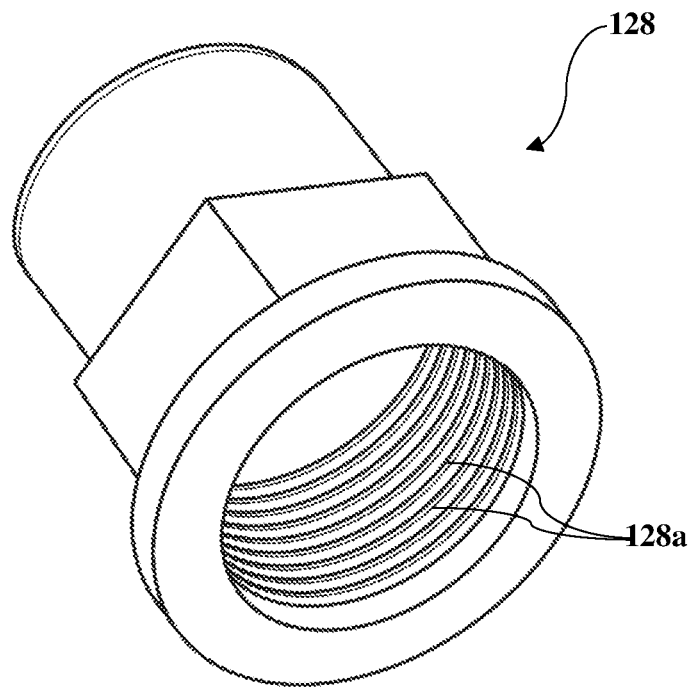
FIG. 9B exemplarily illustrates a perspective view of a push-on cap of the flow control device of an embodiment of the filtered water supply extension system.

FIG. 9B exemplarily illustrates a perspective view of a push-on cap 128 of the flow control device 120 of an embodiment of the filtered water supply extension system 123 shown in FIGS. 1-2, FIGS. 6-7, and FIGS. 10-11. When the flow control device 120 is not is use for filling an external appliance via the supplementary pipe 122 connected thereto as exemplarily illustrated in FIG. 1, the supplementary pipe 122 is disconnected from the outlet end 121c of the control valve 121 exemplarily illustrated in FIG. 9A, and the push-on cap 128 is positioned on the outlet end 121c to plug the outlet end 121c of the control valve 121. The push-on cap 128 securely plugs the additional flow of the filtered water drawn from the extension member 118 through the extension pipe 119 as exemplarily illustrated in FIGS. 1-2. The push-on cap 128 is a protective device configured to protect the outlet end 121c of the control valve 121 of the flow control device 120. In an embodiment, the push-on cap 128 is a round-shaped cap 128 comprising threads 128a as exemplarily illustrated in FIG. 9B, for securely engaging with and plugging the outlet end 121c of the control valve 121. The push-on cap 128 is made, for example, from copper, brass, etc.

FIG. 10 exemplarily illustrates a schematic of another embodiment of the filtered water supply extension system 123 in the second mode. In the second mode as exemplarily illustrated in FIG. 10, the extension member 118 of the filtered water supply extension system 123 is the T-fitting member 131 configured to draw and direct an additional flow of filtered water from the water filter 105 of the refrigerator 100 to at least one external appliance, for example, a coffee maker. As exemplarily illustrated in FIG. 10, the control valve 103 connected to the external water supply system is operably coupled to the inlet pipe 104 of the water filter 105 of the refrigerator 100. In the second mode, the outlet pipe 106 of the water filter 105 is operably coupled to the T-fitting member 131 of the filtered water supply extension system 123. The T-fitting member 131 comprises a first connection element 131a, a second connection element 131b, and a third connection element 131c as disclosed in the descriptions of FIGS. 7-8. The first connection element 131a of the T-fitting member 131 is operably coupled to the water filter 105 via a first pipe, that is, the outlet pipe 106 of the water filter 105. The first connection element 131a of the T-fitting member 131 is configured to draw filtered water from the water filter 105 through the outlet pipe 106.

In an embodiment as exemplarily illustrated in FIG. 10, the second connection element 131b of the T-fitting member 131 is operably coupled to the water storage container 115 of the refrigerator 100 via the second pipe 132. That is, the first end 132a of the second pipe 132 is operably coupled to the second connection element 131b of the T-fitting member 131, and the second end 132b of the second pipe 132 is operably coupled to the water storage container 115. In this embodiment, the second connection element 131b is configured to direct a flow of the filtered water from the water filter 105 to the water storage container 115 via the second pipe 132. The water storage container 115 is configured to store the filtered water. In this embodiment of the second mode as exemplarily illustrated in FIG. 10, the water storage container 115 is operably coupled to the valve assembly 107 via a third pipe 133. That is, a first end 133a of the third pipe 133 is operably coupled to the water storage container 115, and a second end 133b of the third pipe 133 is operably coupled to the valve assembly 107.

The third connection element 131c of the T-fitting member 131 is positioned substantially perpendicular to the first connection element 131a and the second connection element 131b. The third connection element 131c is operably coupled to the flow control device 120 via the extension pipe 119. That is, the first end 119a of the extension pipe 119 is operably coupled to the third connection element 131c of the T-fitting member 131, and the second end 119b of the extension pipe 119 is operably coupled to the control valve 121 of the flow control device 120. The third connection element 131c is configured to direct the additional flow of the filtered water to the flow control device 120 through the extension pipe 119, and thereafter from the flow control device 120 to the external appliance through the supplementary pipe 122 exemplarily illustrated in FIG. 1. In the embodiment exemplarily illustrated in FIG. 10, the valve assembly 107 comprises multiple solenoid valves, for example, two solenoid valves 108 and 109. The first solenoid valve 108 is operably coupled to the ice maker 112 and the second solenoid valve 109 is operably coupled to the water dispenser 117 positioned in the dispenser housing 301 of the refrigerator 100. The first end 111a of the first supply line 111 is operably coupled to the first solenoid valve 108 of the valve assembly 107, and the second end 111b of the first supply line 111 is operably coupled to an inlet 112a of the ice maker 112. Similarly, the first end 116a of the third supply line 116 is operably coupled to the second solenoid valve 109 of the valve assembly 107, and the second end 116b of the third supply line 116 is operably coupled to the water dispenser 117.

In an embodiment, the flow control device 120 through which the filtered water from the water filter 105 is directed to the external appliance is positioned on the rear wall 101a of the refrigerator 100 as exemplarily illustrated in FIG. 2, while the water dispenser 117 through which the filtered water is dispensed is positioned in the dispenser housing 301 on the front door 102a of the refrigerator 100 as exemplarily illustrated in FIG. 3. The T-fitting member 131, therefore, draws and directs an additional flow of filtered water from the water filter 105 to the external appliance in the second mode, without interrupting a regular flow of filtered water from the water filter 105 to the water dispenser 117.

The flow of filtered water within and out of the refrigerator 100 is indicated by arrows in FIG. 10. Water, for example, from the external supply line 127 of the external water supply system of a household or a building, flows into the inlet pipe 104 of the water filter 105 of the refrigerator 100 via the control valve 103. The filtered water produced by the water filter 105 then flows through the outlet pipe 106 of the water filter 105 and into the first connection element 131a of the T-fitting member 131. The T-fitting member 131 divides and directs the flow of the filtered water into the water storage container 115 via the second connection element 131b of the T-fitting member 131 through the second pipe 132 and into the flow control device 120 via the third connection element 131c of the T-fitting member 131 through the extension pipe 119.

The valve assembly 107 draws the filtered water stored in the water storage container 115 through the third pipe 133. The first solenoid valve 108 of the valve assembly 107 draws and directs the flow of the filtered water received from the water storage container 115 through the third pipe 133, into the ice maker 112 through the first supply line 111. The second solenoid valve 109 of the valve assembly 107 draws and directs the flow of the filtered water received from the water storage container 115 through the third pipe 133, to the water dispenser 117 in the dispenser housing 301 on the front door 102a of the refrigerator 100, through the third supply line 116, based on a measured fill option selected by a user on the control panel 130 positioned on the front door 102a of the refrigerator 100. In an embodiment, the water dispenser 117 allows the user to manually fill a cup placed in the dispenser housing 301 with the filtered water received from the valve assembly 107. The flow control device 120 of the filtered water supply extension system 123 at the rear wall 101a of the refrigerator 100 draws and directs the additional flow of the filtered water received from the third connection element 131c of the T-fitting member 131 through the extension pipe 119 to the external appliance via the supplementary pipe 122. The user connects the first end 122a of the supplementary pipe 122 to the control valve 121 of the flow control device 120 and connects the second end 122b of the supplementary pipe 122 to the external appliance as exemplarily illustrated in FIG. 1. The user then operates the handle 121a of the control valve 121 to open the control valve 121 and allow the additional flow of the filtered water to fill the external appliance. In an embodiment, based on a separate measured fill option selected by the user on the control panel 130 positioned on the front door 102a of the refrigerator 100, the microcontroller 501, in communication with the control panel 130 exemplarily illustrated in FIG. 5, automatically initiates and terminates the additional flow of the filtered water to the external appliance without requiring the user to open and close the control valve 121 respectively, by operating the handle 121a of the control valve 121, as disclosed in the detailed descriptions of FIGS. 4A-4B and FIG. 5. The microcontroller 501, in communication with the control panel 130, automatically shuts off the additional flow of the filtered water to the external appliance when the selected quantity of the filtered water is filled in the external appliance. When the filtered water supply extension system 123 is not in use for filling the external appliance, the user disconnects the supplementary pipe 122 and plugs the outlet end 121c of the control valve 121 using the push-on cap 128 of the flow control device 120.

Figure 11:
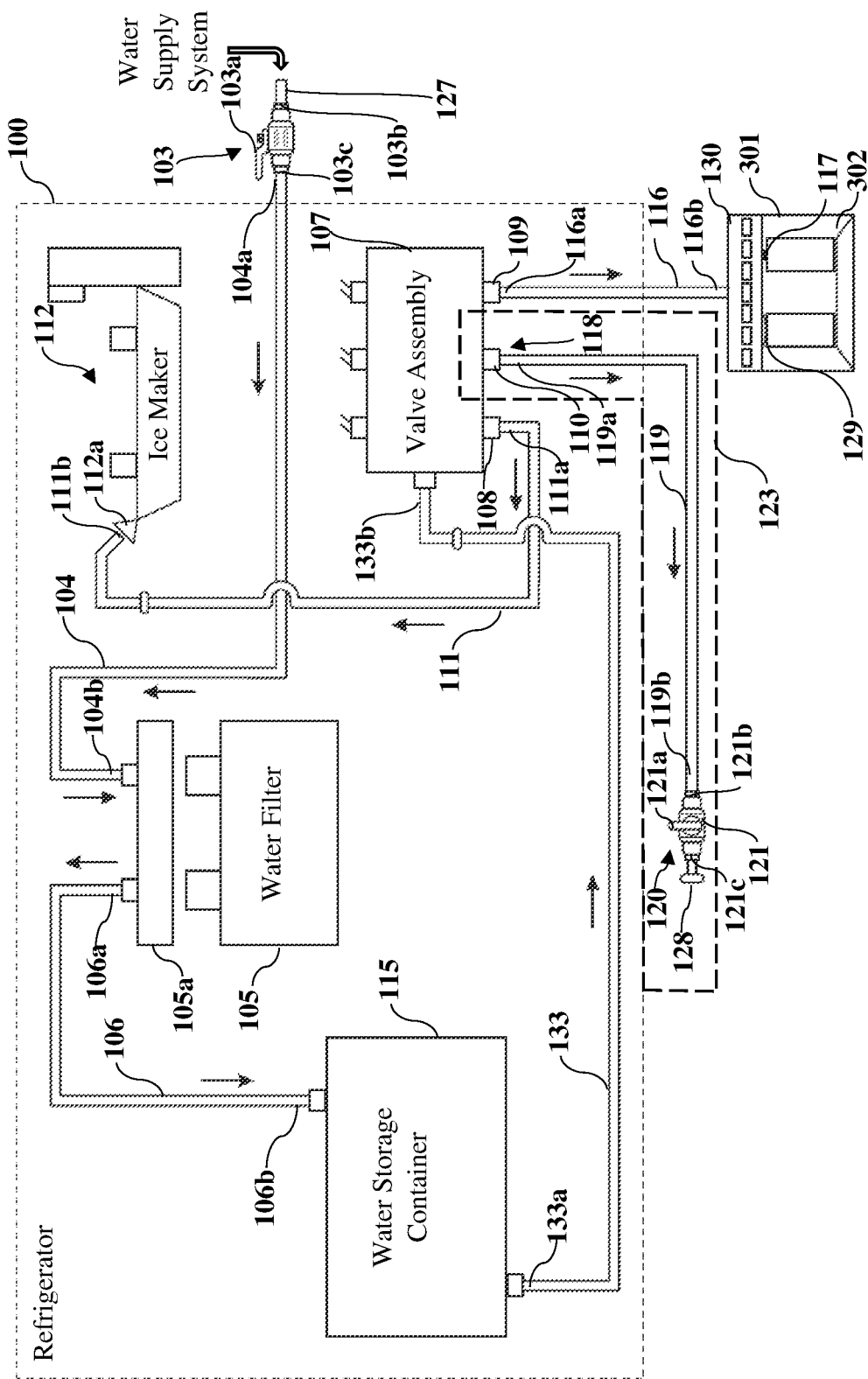
FIG. 11 exemplarily illustrates a schematic of another embodiment of the filtered water supply extension system operating in the first mode.

FIG. 11 exemplarily illustrates a schematic of another embodiment of the filtered water supply extension system 123 in the first mode. As exemplarily illustrated in FIG. 11, the control valve 103 of the external water supply system is operably coupled to the inlet pipe 104 of the water filter 105 of the refrigerator 100. In an embodiment of the first mode, the outlet pipe 106 of the water filter 105 is operably coupled to the water storage container 115. That is, the first end 106a of the outlet pipe 106 is operably coupled to the filter housing 105a of the water filter 105, and the second end 106b of the outlet pipe 106 is operably coupled to the water storage container 115. The water storage container 115 is configured to store the filtered water. In this embodiment of the first mode as exemplarily illustrated in FIG. 11, the water storage container 115 is operably coupled to the valve assembly 107 via a transfer pipe 133. That is, the first end 133a of the transfer pipe 133 is operably coupled to the water storage container 115, and the second end 133b of the transfer pipe 133 is operably coupled to the valve assembly 107 as exemplarily illustrated in FIG. 11.

In the embodiment exemplarily illustrated in FIG. 11, the valve assembly 107 comprises multiple solenoid valves, for example, three solenoid valves 108, 109, and 110. The first solenoid valve 108 is operably coupled to the ice maker 112 via the first supply line 111; the second solenoid valve 109 is operably coupled to the water dispenser 117 via the third supply line 116; and the third solenoid valve 110 configured as the extension member 118 of the filtered water supply extension system 123 is operably coupled to the flow control device 120 via the extension pipe 119. The first end 111a of the first supply line 111 is operably coupled to the solenoid valve 108 of the valve assembly 107, and the second end 111b of the first supply line 111 is operably coupled to the inlet 112a of the ice maker 112. Similarly, the first end 116a of the third supply line 116 is operably coupled to the solenoid valve 109 of the valve assembly 107, and the second end 116b of the third supply line 116 is operably coupled to the water dispenser 117 positioned in the dispenser housing 301 of the refrigerator 100. Furthermore, the first end 119a of the extension pipe 119 is operably coupled to the third solenoid valve 110 of the valve assembly 107, and the second end 119b of the extension pipe 119 is operably coupled to the control valve 121 of the flow control device 120.

In an embodiment, the flow control device 120 through which the additional flow of filtered water is directed to at least one external appliance, for example, a coffee maker 124, is positioned on the rear wall 101a of the refrigerator 100 as exemplarily illustrated in FIGS. 1-2, while the water dispenser 117 through which the filtered water is dispensed is positioned in the dispenser housing 301 positioned on the front door 102a of the refrigerator 100 as exemplarily illustrated in FIG. 3. The extension member 118, therefore, draws and directs the additional flow of filtered water from the water filter 105 to the external appliance in the first mode, without interrupting a regular flow of filtered water from the water filter 105 to the water dispenser 117.

The flow of filtered water within and out of the refrigerator 100 is indicated by arrows in FIG. 11. Water, for example, from the external supply line 127 of the external water supply system of a household or a building, flows into the inlet pipe 104 of the water filter 105 of the refrigerator 100 via the control valve 103. The filtered water produced by the water filter 105 then flows through the outlet pipe 106 of the water filter 105 and into the water storage container 115. The water storage container 115 stores the filtered water and supplies the filtered water to the valve assembly 107 through the transfer pipe 133. The first solenoid valve 108 of the valve assembly 107 draws and directs a flow of filtered water received from the water storage container 115 through the transfer pipe 133, to the ice maker 112 through the first supply line 111. The second solenoid valve 109 of the valve assembly 107 draws and directs a flow of filtered water received from the water storage container 115 through the transfer pipe 133, to the water dispenser 117 in the dispenser housing 301 on the front door 102a of the refrigerator 100 through the third supply line 116.

In an embodiment, the water dispenser 117 dispenses the filtered water into a cup positioned in the recess 302 of the dispenser housing 301 based on a measured fill option selected by a user on the control panel 130 positioned on the front door 102a of the refrigerator 100 as disclosed in the descriptions of FIGS. 4A-4B and FIG. 5. In another embodiment, the user manually operates the water dispenser 117 to dispense a required quantity of filtered water into the cup. In the first mode, the third solenoid valve 110, that is, the extension member 118 of the filtered water supply extension system 123, draws and directs an additional flow of filtered water to the flow control device 120 at the rear wall 101a of the refrigerator 100 through the extension pipe 119. The user connects the first end 122a of the supplementary pipe 122 to the control valve 121 of the flow control device 120 and connects the second end 122b of the supplementary pipe 122 to the external appliance as exemplarily illustrated in FIG. 1. In an embodiment, the user then operates the handle 121a of the control valve 121 to open the control valve 121 and allow the additional flow of the filtered water to fill the external appliance. In an embodiment, based on a separate measured fill option selected by the user on the control panel 130 positioned on the front door 102a of the refrigerator 100, the microcontroller 501, in communication with the control panel 130 exemplarily illustrated in FIG. 5, automatically initiates and terminates the additional flow of the filtered water to the external appliance without requiring the user to open and close the control valve 121 respectively, by operating the handle 121a of the control valve 121, as disclosed in the detailed descriptions of FIGS. 4A-4B and FIG. 5. The microcontroller 501, in communication with the control panel 130, automatically shuts off the additional flow of the filtered water to the external appliance when the selected quantity of the filtered water is filled in the external appliance. When the filtered water supply extension system 123 is not in use for filling the external appliance, the user disconnects the supplementary pipe 122 and plugs the outlet end 121c of the control valve 121 using the push-on cap 128 of the flow control device 120.

Although the descriptions of FIGS. 6-7 and FIGS. 10-11 disclose different configurations of the components, for example, the water filter 105, the water storage container 115, the valve assembly 107, and the extension member 118, of the refrigerator 100 in various embodiments and modes of the filtered water supply extension system 123, the scope of the system and the method disclosed is not limited to the particular configurations exemplarily illustrated in FIGS. 6-7 and FIGS. 10-11, but extends to include multiple other configurations of the components of the refrigerator 100 that allow an additional flow of filtered water to be drawn and directed from the water filter 105 to at least one external appliance, without interrupting a regular flow of filtered water from the water filter 105 to one or more internal appliances, for example, the ice maker 112, the water dispenser 117, etc., of the refrigerator 100.

Figure 12:
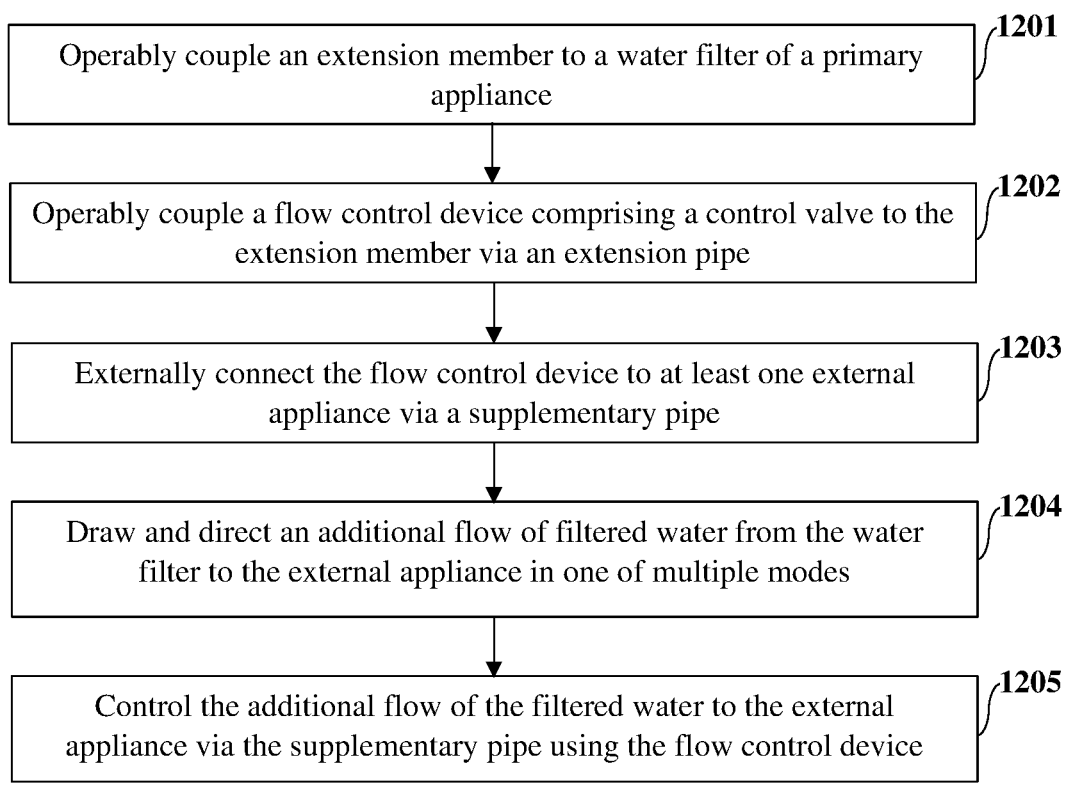
FIG. 12 illustrates a flowchart of an embodiment of a method for extending a filtered water supply of a primary appliance to one or more external appliances.

FIG. 12 illustrates a flowchart of an embodiment of a method for extending a filtered water supply of a primary appliance to one or more external appliances. In the method disclosed herein, the extension member 118 is operably coupled 1201 to the water filter 105 of the primary appliance, for example, a refrigerator 100, as exemplarily illustrated in FIG. 1, FIGS. 6-7, and FIGS. 10-11. The flow control device 120 comprising the control valve 121 is operably coupled 1202 to the extension member 118 via the extension pipe 119 extending from the extension member 118 to the flow control device 120 within the primary appliance as exemplarily illustrated in FIG. 1, FIGS. 6-7, and FIGS. 10-11. The flow control device 120 is also externally connected 1203 to at least one external appliance via the supplementary pipe 122 as exemplarily illustrated in FIG. 1. The extension member 118 draws and directs 1204 an additional flow of filtered water from the water filter 105 to at least one external appliance in a first mode or a second mode as disclosed in the descriptions of FIG. 1, FIGS. 6-7, and FIGS. 10-11, without interrupting a regular flow of filtered water from the water filter 105 to one or more internal appliances of the primary appliance. The flow control device 120 controls 1205 the additional flow of the filtered water to at least one external appliance via the supplementary pipe 122. Furthermore, in addition to providing a measured fill option for dispensing a measured quantity of filtered water through an internal appliance, for example, the water dispenser 117, the method disclosed herein provides an additional measured fill option on the primary appliance for separately dispensing a measured quantity of filtered water as selected by a user to one or more external appliances from the primary appliance.

In the system and the method disclosed herein, in addition to a measured fill option for the water dispenser 117, the filtered water supply extension system 123 provides an additional measured fill option for dispensing a measured quantity of the filtered water, for example, about 1 cup to about 12 cups of the filtered water, to at least one external appliance. The filtered water supply extension system 123 extends the function of the microcontroller 501 exemplarily illustrated in FIG. 5, to feed an additional voltage to the additional solenoid valve 110 configured in the valve assembly 107 as the extension member 118 of the filtered water supply extension system 123, for implementing the additional measured fill option that dispenses the measured quantity of the filtered water to at least one external appliance based on user inputs on the control panel 130. Furthermore, the automatic initiation and termination of the additional flow of the selected quantity of filtered water into the external appliance by the filtered water supply extension system 123 using the microcontroller 501, in communication with the control panel 130, eliminate the need to manually open and close the control valve 121 of the flow control device 120 to reach the selected quantity of filtered water needed in the external appliance. The filtered water supply extension system 123 saves costs by tapping into the filtered water supply provided by the water filter 105 already contained in the refrigerator 100, thereby eliminating the need for purchasing and maintaining a separate, secondary water filter. The filtered water supply extension system 123 also saves time and effort by eliminating the need to remove an external appliance, for example, a coffee maker 124, from under the kitchen cabinets to make room for removing the carafe 125 exemplarily illustrated in FIG. 1, or reservoir, or pitcher of the coffee maker 124, manually filling filtered water into the carafe 125, or reservoir, or pitcher from another water source or a separate water filter, waiting for the filtered water to fill into the carafe 125, or reservoir, or pitcher from the other water source or the separate water filter, and then reinstalling to coffee maker 124 under the kitchen cabinets.

It is apparent in different embodiments that the various methods, algorithms, and computer-readable programs disclosed herein are implemented on non-transitory, computer-readable storage media appropriately programmed for microcontrollers. The non-transitory, computer-readable storage media participate in providing data, for example, instructions that are read by a processor or a similar device in a microcontroller. The "non-transitory, computer-readable storage media" also refer to any medium capable of storing or encoding a set of instructions for execution by a processor or a similar device of the microcontroller and that causes a processor or a similar device of the microcontroller to perform any one or more of the processing and control steps of the method disclosed herein. In an embodiment, hard-wired circuitry or custom hardware is used in place of, or in combination with, software instructions for implementing the processes of various embodiments. Therefore, the embodiments are not limited to any specific combination of hardware and software. Various aspects of the embodiments disclosed herein are implemented in a non-programmed environment comprising formats that render aspects of a graphical user interface (GUI) or perform other functions, when viewed in a visual area of the control panel. Various aspects of the embodiments disclosed herein are implemented as programmed elements, or non-programmed elements, or any suitable combination thereof.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, satellite internet, a local area network (LAN), a wide area network (WAN) or the Ethernet, or via any appropriate communications mediums or combination of communications mediums. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers. The embodiments disclosed herein are not limited to a particular computer system platform, processor, operating system, or network comprising, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the embodiments disclosed herein. Dimensions of various parts of the system disclosed above are exemplary, and are not limiting of the scope of the embodiments herein. While the embodiments have been described with reference to various illustrative implementations, drawings, and techniques, it is understood that the words, which have been used herein, are words of description and illustration, rather than words of limitation. Furthermore, although the embodiments have been described herein with reference to particular means, materials, techniques, and implementations, the embodiments herein are not intended to be limited to the particulars disclosed herein; rather, the embodiments extend to all functionally equivalent structures, methods and uses, such as are within the scope of the appended claims. It will be understood by those skilled in the art, having the benefit of the teachings of this specification, that the embodiments disclosed herein are capable of modifications and other embodiments may be effected and changes may be made thereto, without departing from the scope and spirit of the embodiments disclosed herein.

We claim:

1. A filtered water supply extension system comprising:
    an extension member operably coupled to a water filter of a primary appliance, wherein the extension member is a T-fitting member configured to draw and direct additional flow of filtered water from the water filter to one or more of a plurality of external appliances in one of a plurality of modes, without interrupting a regular flow of the filtered water from the water filter to one or more of a plurality of internal appliances of the primary appliance, and wherein the T-fitting member comprises:
        a first connection element operably coupled to the water filter via a first pipe, wherein the first connection element is configured to draw the filtered water from the water filter;
        a second connection element operably coupled to one of a valve assembly and a water storage container of the primary appliance via a second pipe, wherein the second connection element is configured to direct a flow of the filtered water from the water filter to the one of the valve assembly and the water storage container via the second pipe, and wherein the water storage container is configured to store the filtered water; and
        a third connection element positioned substantially perpendicular to the first connection element and the second connection element, wherein the third connection element is operably coupled to a flow control device via an extension pipe, and wherein the third connection element is configured to direct the additional flow of the filtered water to the flow control device through the extension pipe, and thereafter from the flow control device to the one or more of the plurality of external appliances through a supplementary pipe; and
    said flow control device comprising a control valve operably coupled to the extension member via the extension pipe extending from the extension member to the flow control device within the primary appliance, wherein the flow control device is externally connected to the one or more of the plurality of external appliances via the supplementary pipe and is configured to control the additional flow of the filtered water to the one or more of the plurality of external appliances through the supplementary pipe.

2. The filtered water supply extension system of claim 1, wherein the flow control device further comprises a push-on cap configured to plug the control valve when not in use for directing the additional flow of the filtered water to the one or more of the plurality of external appliances through the supplementary pipe, and wherein the flow control device is positioned on one of a rear wall and a side wall of the primary appliance.

3. The filtered water supply extension system of claim 1, further comprising the valve assembly operably coupled to the water filter and the one or more of the plurality of internal appliances of the primary appliance, wherein the valve assembly is configured to draw and direct a flow of the filtered water from the water filter to the one or more of the plurality of internal appliances via respective supply lines.

4. The filtered water supply extension system of claim 3, wherein the valve assembly comprises a plurality of solenoid valves, wherein one of the plurality of solenoid valves is the extension member configured to draw and direct the additional flow of the filtered water to the one or more of the plurality of external appliances in said one of the modes through the extension pipe and the flow control device, and wherein another one or more of the plurality of solenoid valves are operably coupled to the one or more of the plurality of internal appliances via the respective supply lines and are configured to draw and direct the flow of the filtered water to the one or more of the plurality of internal appliances via the respective supply lines.

5. The filtered water supply extension system of claim 3, wherein the water storage container is operably coupled to one of the valve assembly and the water filter, wherein the water storage container is configured to draw, store, and direct a flow of the filtered water drawn from the one of the valve assembly and the water filter to the one or more of the internal appliances via the respective supply lines.

6. The filtered water supply extension system of claim 3, further comprising:
    a control panel positioned on a front section of the primary appliance, wherein the control panel comprises a user interface with separate measured fill options for selectively controlling the filtered water flowing through the valve assembly to the one or more of the plurality of external appliances and the one or more of the plurality of internal appliances; and
    a microcontroller operably connected to the control panel and the valve assembly, wherein the microcontroller is configured to process user inputs received via the control panel and operate the valve assembly for drawing and directing a measured quantity of the filtered water to the one or more of the plurality of external appliances and the one or more of the plurality of internal appliances.

7. The filtered water supply extension system of claim 1, wherein the primary appliance is a refrigerator, and wherein the plurality of external appliances comprise a beverage maker, a kettle, a water bottle, an external fluid dispenser, and a liquid container, and wherein the plurality of internal appliances comprise an ice maker, a water storage container, and a water dispenser positioned at predetermined locations within the primary appliance.

8. A method for extending a filtered water supply of a primary appliance to one or more of a plurality of external appliances, the method comprising:
operably coupling an extension member to a water filter of the primary appliance, wherein the extension member is T-fitting member configured to draw and direct an additional flow of filtered water from the water filter to the one or more of the plurality of external appliances, in one of a plurality of modes, without interrupting a regular flow of filtered water from the water filter to one or more of a plurality of internal appliances of the primary appliance, and wherein the T-fitting member comprises:
a first connection element operably coupled to the water filter via a first pipe, wherein the first connection element is configured to draw the filtered water from the water filter;
a second connection element operably coupled to one of a valve assembly and a water storage container of the primary appliance via a second pipe, wherein the second connection element is configured to direct a flow of the filtered water from the water filter to the one of the valve assembly and the water storage container via the second pipe, and wherein the water storage container is configured to store the filtered water; and
a third connection element positioned substantially perpendicular to the first connection element and the second connection element, wherein the third connection element is operably coupled to a flow control device via an extension pipe, and wherein the third connection element is configured to direct the additional flow of the filtered water to the flow control device through the extension pipe, and thereafter from the flow control device to the one or more of the plurality of external appliances through a supplementary pipe;
operably coupling the flow control device comprising a control valve to the extension member via the extension pipe extending from the extension member to the flow control device within the primary appliance;
externally connecting the flow control device to the one or more of the plurality of external appliances via the supplementary pipe;
drawing and directing the additional flow of filtered water from the water filter by the extension member to the one or more of the plurality of external appliances in one of the plurality of modes, without interrupting the regular flow of the filtered water from the water filter to the one or more of the plurality of internal appliances of the primary appliance; and
controlling the additional flow of the filtered water to the one or more of the plurality of external appliances via the supplementary pipe using the flow control device.

9. The method of claim 8, further comprising plugging the control valve of the flow control device using a push-on cap when not in use for directing the additional flow of the filtered water to the one or more of the plurality of external appliances through the supplementary pipe, wherein the flow control device is positioned on one of a rear wall and a side wall of the primary appliance.

10. The method of claim 8, further comprising operably coupling the extension member to the valve assembly within the primary appliance, wherein the valve assembly is operably coupled to the water filter and the one or more of the plurality of internal appliances of the primary appliance, wherein the valve assembly is configured to draw and direct a flow of the filtered water from the water filter to the one or more of the plurality of internal appliances via respective supply lines.

11. The method of claim 10, wherein the valve assembly comprises a plurality of solenoid valves, wherein one of the plurality of solenoid valves is the extension member configured to draw and direct the additional flow of the filtered water to the one or more of the plurality of external appliances in said one of the modes through the extension pipe and the flow control device, and wherein another one or more of the plurality of solenoid valves are operably coupled to the one or more of the plurality of internal appliances via the respective supply lines and are configured to draw and direct the flow of the filtered water to the one or more of the plurality of internal appliances via the respective supply lines.

12. The method of claim 10, further comprising operably coupling the water storage container to one of the valve assembly and the water filter, wherein the water storage container is configured to draw, store, and direct a flow of the filtered water drawn from the one of the valve assembly and the water filter to the one or more of the internal appliances via the respective supply lines.

13. The method of claim 10, further comprising:
configuring a control panel on a front section of the primary appliance, wherein the control panel comprises a user interface with separate measured fill options for selectively controlling the filtered water flowing through the valve assembly to the one or more of the plurality of external appliances and the one or more of the plurality of internal appliances; and
operably connecting a microcontroller of the primary appliance to the control panel and the valve assembly, wherein the microcontroller is configured to process user inputs received via the control panel and operate the valve assembly for drawing and directing a measured quantity of the filtered water to the one or more of the plurality of external appliances and the one or more of the plurality of internal appliances.

14. The method of claim 8, wherein the primary appliance is a refrigerator, and wherein the plurality of external appliances comprise a beverage maker, a kettle, a water bottle, an external fluid dispenser, and a liquid container, and wherein the plurality of internal appliances comprise an ice maker, a water storage container, and a water dispenser positioned at predetermined locations within the primary appliance.

15. A refrigerator comprising: an enclosure comprising a rear wall, side walls, a top wall, a bottom wall, and one or more front doors; a water filter positioned at a predetermined location in the enclosure, wherein the water filter is configured to filter water drawn from a water supply system; a valve assembly operably coupled to the water filter and one or more of a plurality of internal appliances of the refrigerator, wherein the valve assembly is configured to draw and direct a flow of the filtered water from the water filter to one or more of the plurality of internal appliances via respective supply lines; a water storage container operably coupled to one of the valve assembly and the water filter, wherein the water storage container is configured to draw, store, and direct a flow of the filtered water drawn from the one of the valve assembly and the water filter to the one or more of the internal appliances via the respective supply lines; an extension member operably coupled to the water filter, wherein the extension member is configured to draw and direct an additional flow of filtered water from the water filter to one or more of a plurality of external appliances, in one of a plurality of modes, without interrupting a regular flow of filtered water from the water filter to the one or more of the plurality of internal appliances of the primary appliance, wherein the extension member is a T-fitting member, and wherein the T-fitting member comprises: a first connection element operably coupled to the water filter via a first pipe, wherein the first connection element is configured to draw the filtered water from the water filter;

a second connection element operably coupled to one of the valve assembly and the water storage container of the primary appliance via a second pipe, wherein the second connection element is configured to direct a flow of the filtered water from the water filter to the one of the valve assembly and the water storage container via the second pipe, and wherein the water storage container is configured to store the filtered water; and a third connection element positioned substantially perpendicular to the first connection element and the second connection element, wherein the third connection element is operably coupled to a flow control device via an extension pipe, and wherein the third connection element is configured to direct the additional flow of the filtered water to the flow control device through the extension pipe, and thereafter from the flow control device to the one or more of the plurality of external appliances through a supplementary pipe; and said flow control device comprising a control valve operably coupled to the extension member via the extension pipe extending from the extension member to the flow control device within the enclosure, wherein the flow control device is externally connected to the at least one external appliance via the supplementary pipe, and wherein the flow control device is configured to control the additional flow of the filtered water to the one or more of the plurality of external appliances through the supplementary pipe.

16. The refrigerator of claim 15, wherein the flow control device further comprises a push-on cap configured to plug the control valve when not in use for directing the additional flow of the filtered water to the one or more of the plurality of external appliances through the supplementary pipe, and wherein the flow control device is positioned on one of the rear wall and the side walls of the enclosure.

17. The refrigerator of claim 15, wherein the valve assembly comprises a plurality of solenoid valves, wherein one of the plurality of solenoid valves is the extension member configured to draw and direct the additional flow of the filtered water to the one or more of the plurality of external appliances in said one of the modes through the extension pipe and the flow control device, and wherein another one or more of the plurality of solenoid valves are operably coupled to the one or more of the plurality of internal appliances via the respective supply lines and are configured to draw and direct the flow of the filtered water to the one or more of the plurality of internal appliances via the respective supply lines.

18. The refrigerator of claim 15, further comprising:
a control panel positioned on a front section of the enclosure, wherein the control panel comprises a user interface with separate measured fill options for selectively controlling the filtered water flowing through the valve assembly to the one or more of the plurality of external appliances and the one or more of the plurality of internal appliances; and a microcontroller operably connected to the control panel and the valve assembly, wherein the microcontroller is configured to process user inputs received via the control panel and operate the valve assembly for drawing and directing a measured quantity of the filtered water to the one or more of the plurality of external appliances and the one or more of the plurality of internal appliances.

19. The refrigerator of claim 15, wherein the plurality of external of appliances comprise a beverage maker, a kettle, a water bottle, an external fluid dispenser, and a liquid container, and wherein the plurality of internal appliances comprise an ice maker and a water dispenser, and wherein the water dispenser is configured to receive the filtered water stored in the water storage container via a respective pipe.

* * * * *